(12) United States Patent
He

(10) Patent No.: US 12,348,613 B2
(45) Date of Patent: Jul. 1, 2025

(54) ENCRYPTED PACKET INSPECTION METHOD AND PROTECTION DEVICE

(71) Applicant: Huawei Technologies Co., Ltd., Shenzhen (CN)

(72) Inventor: Xinqian He, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 251 days.

(21) Appl. No.: 18/306,681

(22) Filed: Apr. 25, 2023

(65) Prior Publication Data

US 2023/0261858 A1 Aug. 17, 2023

Related U.S. Application Data

(63) Continuation of application No. PCT/CN2021/088501, filed on Apr. 20, 2021.

(30) Foreign Application Priority Data

Oct. 26, 2020 (CN) .......................... 202011155469.4
Nov. 30, 2020 (CN) .......................... 202011377786.0

(51) Int. Cl.
*H04L 9/08* (2006.01)

(52) U.S. Cl.
CPC .......... *H04L 9/0825* (2013.01); *H04L 9/0841* (2013.01); *H04L 9/0869* (2013.01)

(58) Field of Classification Search
CPC ... H04L 9/0825; H04L 9/0841; H04L 9/0869; H04L 9/0662; H04L 63/0281; H04L 63/0428; H04L 63/061
See application file for complete search history.

(56) References Cited

U.S. PATENT DOCUMENTS 9,385,864 B2 * 7/2016 Pahl .......................... H04L 9/14
2009/0210712 A1 8/2009 Fort
(Continued)

FOREIGN PATENT DOCUMENTS

| CN | 1658552 A | 8/2005 |
|---|---|---|
| CN | 101459506 A | 6/2009 |

(Continued)

OTHER PUBLICATIONS

Wikipedia, Diffie-Herman key exchange, https://zh.wikipedia.org/wiki, Oct. 2, 2015, with the English Translation, 14 pages.
(Continued)

*Primary Examiner* — Mohammed Waliullah
(74) *Attorney, Agent, or Firm* — Slater Matsil, LLP

(57) ABSTRACT

This application provides an encrypted packet inspection method and a protection device, and pertains to the field of communication technologies. In this application, a process of performing SSL handshake between a protection device and a client device is associated with a process of performing SSL handshake between the protection device and a server. The protection device sends a same DH parameter to each of the client device and the server, and reuses DH parameters on the two sides when generating session keys, where the session key is used to decrypt an encrypted packet sent by the client device or the server, and encrypt plaintext data obtained after decryption and inspection. In embodiments of this application, a computation amount caused by DH parameter generation is reduced, and resource usage of a protection device such as a firewall is reduced.

19 Claims, 17 Drawing Sheets

(56) References Cited

U.S. PATENT DOCUMENTS

| | | | |
|---|---|---|---|
| 2010/0005297 A1 | 1/2010 | Ganesan | |
| 2015/0067338 A1 | 3/2015 | Gero et al. | |
| 2018/0167207 A1* | 6/2018 | Chaubey | H04L 9/0841 |
| 2023/0261858 A1* | 8/2023 | He | H04L 63/061 |
| | | | 713/171 |

FOREIGN PATENT DOCUMENTS

| | | | |
|---|---|---|---|
| CN | 101540999 A | | 9/2009 |
| CN | 102158860 A | | 8/2011 |
| CN | 104618903 A | | 5/2015 |
| CN | 106888206 A | | 6/2017 |
| CN | 106941401 A | | 7/2017 |
| CN | 106972919 A | | 7/2017 |
| CN | 108199850 A | | 6/2018 |
| CN | 108200104 A | | 6/2018 |
| CN | 109600226 A | | 4/2019 |
| CN | 109905348 A | | 6/2019 |
| CN | 110351080 A | | 10/2019 |
| KR | 20180031435 A | * | 3/2018 |
| WO | 2016073552 A1 | | 5/2016 |

OTHER PUBLICATIONS

Zhao, Anjun et al., "A Fast Handshake Protocol for TLS, Computer Engineering", Jan. 2004, with the English Abstract Translation total 4 pages.

Wikipedia, "Public-key encryption", https://zh.wikipedia.org/wiki, none, with the English Translation, 8 pages. Retrieved May 1, 2022.

Wikipedia, "Transport Layer Security protocols", https://zh.wikipedia.org/wiki, Aug. 11, 2020, with the English Translation, 17 pages.

* cited by examiner

ENCRYPTED PACKET INSPECTION METHOD AND PROTECTION DEVICE

CROSS-REFERENCE TO RELATED APPLICATIONS

This application is a continuation of International Application No. PCT/CN2021/088501, filed on Apr. 20, 2021, which claims priority to Chinese Patent Application No. 202011155469.4, filed on Oct. 26, 2020, and Chinese Patent Application No. 202011377786.0, filed on Nov. 30, 2020. All of the aforementioned patent applications are hereby incorporated by reference in their entireties.

TECHNICAL FIELD

This application relates to the field of communication technologies, and in particular, to an encrypted packet inspection method and a protection device.

BACKGROUND

In a TCP/IP protocol suite (TCP/IP Protocols) with a multi-layer structure, the secure socket layer/transport layer security (SSL/TLS) is located between the hypertext transfer protocol (HTTP) and the transmission control protocol (TCP). For HTTPS-based (HTTP over TLS) interaction traffic, a TCP connection needs to be first established like common HTTP traffic, and then SSL/TLS handshake needs to be performed on the TCP connection to establish an SSL/TLS session. The SSL/TLS session is used for encrypting HTTP interaction content to ensure privacy, reliability, and trustworthiness in data transmission.

When an encrypted packet is transmitted between a client and a server based on the SSL/TLS, how a firewall deployed between the client and the server performs security inspection on the encrypted packet becomes an urgent problem to be resolved. Currently, a solution based on an SSL/TLS man-in-the-middle technology is a mainstream solution.

A basic principle of the SSL/TLS man-in-the-middle technology is that the firewall functions as a proxy server to perform SSL/TLS handshake with the client. In addition, the firewall functions as a proxy client to perform SSL/TLS handshake with the server.

According to the SSL/TLS man-in-the-middle technology, the firewall functions as an endpoint of an SSL/TLS session and independently performs SSL handshake with the server and the client device. When the foregoing method is used, a computation workload is heavy because the firewall negotiates various encryption keys and encryption parameters with the server and the client device. This leads to high firewall resource usage and low performance.

SUMMARY

Embodiments of this application provide an encrypted packet inspection method and a protection device, to help reduce device resource usage and improve device performance. The technical solution is as follows:

According to a first aspect, an encrypted packet inspection method is provided. According to the method, a protection device separately sends a man-in-the-middle Diffie-Hellman (DH) parameter to a client device and a server, where the protection device is deployed between the client device and the server, and the man-in-the-middle DH parameter is a DH parameter generated by the protection device; the protection device generates a first session key based on the man-in-the-middle DH parameter and a client DH parameter, where the client DH parameter is a DH parameter generated by the client device; the protection device generates a second session key based on the man-in-the-middle DH parameter and a server DH parameter, where the server DH parameter is a DH parameter generated by the server; the protection device receives an original encrypted packet; and if the original encrypted packet is from the client device, the protection device decrypts the original encrypted packet with the first session key, inspects plaintext data obtained through decryption, encrypts the inspected data with the second session key to obtain a target encrypted packet, and sends the target encrypted packet to the server; or if the original encrypted packet is from the server, the protection device decrypts the original encrypted packet with the second session key, inspects plaintext data obtained through decryption, encrypts the inspected data with the first session key to obtain a target encrypted packet, and sends the target encrypted packet to the client device.

According to the method provided in the first aspect, a process of performing SSL handshake between the protection device and the client device is associated with a process of performing SSL handshake between the protection device and the server. The protection device sends the same DH parameter to each of the client device and the server, and reuses the DH parameters on the two sides when generating the session keys. In this way, a computation amount caused by DH parameter generation is reduced, and resource usage of the protection device such as a firewall is reduced. This greatly increases an SSL handshake speed, and improves performance of the protection device.

Optionally, that a protection device separately sends a man-in-the-middle DH parameter to a client device and a server includes: The protection device receives an original client key exchange message from the client device; the protection device replaces the client DH parameter in the original client key exchange message with the man-in-the-middle DH parameter to obtain a target client key exchange message; the protection device sends the target client key exchange message to the server; the protection device receives an original server key exchange message from the server; the protection device replaces the server DH parameter in the original server key exchange message with the man-in-the-middle DH parameter to obtain a target server key exchange message; and the protection device sends the target server key exchange message to the client device.

In this way, because handshake is performed with a real client and a real server, the protection device only needs to generate a small quantity of parameters and perform packet parsing and content replacement based on handshake messages sent by the two sides. Then handshake with the two sides can be performed. In this way, high resource overheads can be reduced.

Optionally, before the protection device obtains the target server key exchange message, the method further includes: The protection device replaces a server signature in the original server key exchange message with a man-in-the-middle signature, where the man-in-the-middle signature is obtained by signing the man-in-the-middle DH parameter with a private key of the protection device.

In this optional manner, the protection device replaces the server signature with the man-in-the-middle signature, so that the man-in-the-middle DH parameter is transmitted to the client device together with the man-in-the-middle signature, thereby reducing a probability of transmission failure due to signature verification failure, and improving a success rate of transmitting the man-in-the-middle DH parameter.

Optionally, that the protection device generates a first session key based on the man-in-the-middle DH parameter and a client DH parameter includes: The protection device generates a first premaster key by using the man-in-the-middle DH parameter and the client DH parameter; the protection device generates the first session key by using the first premaster key, a client random number, and a server random number, where the client random number is a random number generated by the client device, and the server random number is a random number generated by the server; and that the protection device generates a second session key based on the man-in-the-middle DH parameter and a server DH parameter includes: The protection device generates a second premaster key by using the man-in-the-middle DH parameter and the server DH parameter; and the protection device generates the second session key by using the second premaster key, the client random number, and the server random number.

In this optional manner, the protection device reuses the random numbers generated by the client device and the server when generating the session keys, thereby avoiding overheads caused by separately generating the random numbers.

Optionally, the client random number is extracted by the protection device from an original client hello message, and the server random number is extracted by the protection device from an original server hello message.

In this optional manner, the protection device can obtain the random number from the received original hello message. This reduces implementation complexity.

Optionally, before that a protection device separately sends a man-in-the-middle DH parameter to a client device and a server, the method includes: The protection device receives an original client hello message from the client device, where the original client hello message includes an algorithm list; the protection device deletes an identifier of a first algorithm in the algorithm list from the original client hello message, to obtain a target client hello message, where the first algorithm is an algorithm that is not supported by the protection device; and the protection device sends the target client hello message to the server.

In this optional manner, both security and compatibility are ensured, and flexibility is high.

Optionally, that the protection device decrypts the original encrypted packet with the first session key includes: The protection device decrypts the original encrypted packet with the first session key according to a second algorithm, where the second algorithm is an algorithm corresponding to an algorithm identifier left after the identifier of the first algorithm is deleted from the algorithm list; that the protection device encrypts the inspected data with the second session key to obtain a target encrypted packet includes: The protection device encrypts the inspected data with the second session key according to the second algorithm, to obtain a target encrypted packet; that the protection device decrypts the original encrypted packet with the second session key includes: The protection device decrypts the original encrypted packet with the second session key according to the second algorithm; and that the protection device encrypts the inspected data with the first session key to obtain a target encrypted packet includes: The protection device encrypts the inspected data with the first session key according to the second algorithm, to obtain the target encrypted packet.

In this optional manner, it is ensured that the client, the protection device, and the server use an algorithm supported by all the three parties to encrypt and decrypt data in a data transmission phase, thereby avoiding security inspection failure caused because the protection device does not support an algorithm required for decryption.

Optionally, before that a protection device separately sends a man-in-the-middle DH parameter to a client device and a server, the method further includes: The protection device receives an original server hello message from the server; the protection device replaces a server certificate in the original server hello message with a man-in-the-middle certificate, to obtain a target server hello message, where the server certificate includes a public key of the server, and the man-in-the-middle certificate includes a public key of the protection device; and the protection device sends the target server hello message to the client device.

In this option manner, the protection device replaces a certificate of the server to ensure that a man-in-the-middle signature can be verified by the client device, to avoid transmission failure of data (such as the man-in-the-middle DH parameter) transmitted to the client device together with the man-in-the-middle signature due to signature verification failure.

Optionally, the protection device includes a hardware accelerator, and the hardware accelerator is configured to: generate the man-in-the-middle DH parameter, generate a session key, decrypt the original encrypted packet, or encrypt the inspected data. If the hardware accelerator is configured to generate the session key, that the protection device generates a first session key based on the man-in-the-middle DH parameter and a client DH parameter includes: The protection device inputs the man-in-the-middle DH parameter and the client DH parameter into the hardware accelerator, and receives the first session key generated by the hardware accelerator; and that the protection device generates a second session key based on the man-in-the-middle DH parameter and a server DH parameter includes: The protection device inputs the man-in-the-middle DH parameter and the server DH parameter into the hardware accelerator, and receives the second session key generated by the hardware accelerator. If the hardware accelerator is configured to decrypt the original encrypted packet, that the protection device decrypts the original encrypted packet with the first session key includes: The protection device inputs the first session key and the original encrypted packet into the hardware accelerator, and receives the plaintext data obtained through decryption by the hardware accelerator; and that the protection device decrypts the original encrypted packet with the second session key includes: The protection device inputs the second session key and the original encrypted packet into the hardware accelerator, and receives the plaintext data obtained through decryption by the hardware accelerator. If the hardware accelerator is configured to encrypt the inspected data, that the protection device encrypts the inspected data with the second session key includes: The protection device inputs the second session key and the inspected data into the hardware accelerator, and receives the target encrypted packet obtained through encryption by the hardware accelerator; and that the protection device encrypts the inspected data with the first session key: The protection device inputs the first session key and the inspected data into the hardware accelerator, and receives the target encrypted packet obtained through encryption by the hardware accelerator.

In this optional manner, steps including performance-consuming algorithms are processed by dedicated acceleration hardware. In this way, resource usage and performance are greatly improved.

According to a second aspect, a protection device is provided. The protection device has a function of implementing any one of the first aspect or the optional manners of the first aspect. The protection device includes at least one unit, and the at least one unit is configured to implement the method according to any one of the first aspect or the optional manners of the first aspect.

In some embodiments, the units in the protection device are implemented by using software, and the units in the protection device are program modules. In some other embodiments, the units in the protection device are implemented by using hardware or firmware. For specific details of the protection device provided in the second aspect, refer to any one of the first aspect or the implementations of the first aspect. Details are not described herein again.

According to a third aspect, a protection device is provided. The protection device includes a processor and a communication interface. The processor is configured to execute instructions, so that the protection device performs the method according to any one of the first aspect or the optional manners of the first aspect. The communication interface is configured to receive or send a message. For specific details of the protection device provided in the third aspect, refer to any one of the first aspect or the implementations of the first aspect. Details are not described herein again.

According to a fourth aspect, a computer-readable storage medium is provided, where the storage medium stores at least one instruction. When the instruction is run on a computer, the computer is enabled to perform the method according to any one of the first aspect or the optional manners of the first aspect.

According to a fifth aspect, a computer program product is provided, where the computer program product includes one or more computer program instructions, and when the computer program instructions are loaded and run by a computer, the computer is enabled to perform the method according to any one of the first aspect or the optional manners of the first aspect.

According to a sixth aspect, a chip is provided, including a memory and a processor, where the memory is configured to store computer instructions, and the processor is configured to invoke the computer instructions from the memory and run the computer instructions, to perform the method according to any one of the first aspect and the possible implementations of the first aspect.

According to a seventh aspect, a network system is provided. The network system includes a protection device, the network system further includes a client device or a server, and the protection device is configured to perform the method according to any one of the first aspect or the optional manners of the first aspect.

DETAILED DESCRIPTION OF ILLUSTRATIVE EMBODIMENTS

To make objectives, technical solutions, and advantages of this application clearer, the following further describes implementations of this application in detail with reference to accompanying drawings.

SSL/TLS encrypted traffic is increasingly used in an internet. According to statistics from Google, about 90% of traffic is hypertext transfer protocol secure (HTTPS) traffic. HTTPS is also referred to as HTTP over TLS. Currently, most network security detection technologies are implemented based on in-depth traffic identification and parsing. If a plaintext cannot be obtained through decryption, most network security technologies become ineffective. How protection devices inspect encrypted traffic is a hot-spot issue.

Figure 1:
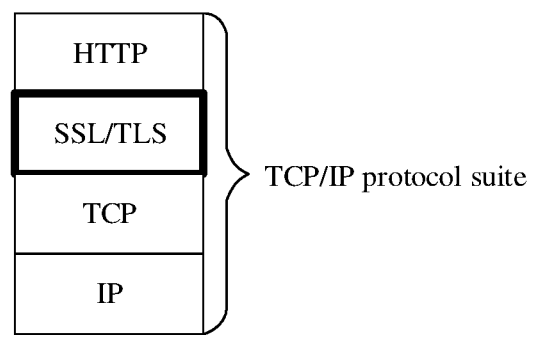
FIG. 1 is a schematic diagram of a position of SSL/TLS in a protocol suite according to an embodiment of this application.

Refer to FIG. 1. In a multi-layer TCP/IP protocol suite, SSL/TLS is located between the HTTP and the TCP. For HTTPS-based interaction traffic, both communication parties first need to establish a transmission control protocol (TCP) connection like common HTTP traffic. Then, on the TCP connection, both communication parties need to perform SSL/TLS handshake, establish an SSL/TLS session, and use the SSL/TLS session to encrypt HTTP interaction content to ensure privacy, reliability, and trustworthiness of data transmission.

An SSL/TLS session mainly includes two phases: handshake phase and data transmission phase.

In the handshake phase, the devices of both sides in the SSL/TLS session negotiate a secure and reliable session key for subsequent data transmission based on asymmetric cryptography (also referred to as public-key cryptography) and key agreement algorithms.

In the data transmission phase, the devices of both sides in the SSL/TLS session use the algorithm and session key agreed in the handshake phase to encrypt application layer (such as HTTP) data before transmission. The data transmission phase is also called the symmetric cryptography phase.

A key agreement process is the focus. There are many algorithms for key agreement. Most of these algorithms are based on complex mathematical theories and require a large quantity of mathematical operations. The Diffie-Hellman (DH) algorithm is most widely used. The DH algorithm includes an elliptic curve DH (ECDH) algorithm. The DH algorithm enables two communication parties to create a key via an insecure channel without any information about each other. The two communication parties that using the DH algorithm for negotiation generate DH parameters separately. To be brief, the DH parameters of both communication parties may be divided into two parts: a public part and a private part. The communication parties exchange public parts of the DH parameters. The DH algorithm ensures that both communication parties can calculate a same secret (that is, key information used to finally generate a session key) by using the DH parameters (public parts and private parts) respectively and the public part of the DH parameter of the peer. Any third party cannot obtain the secret through computation by using only the public parts of the DH parameters disclosed by both communication parties.

Figure 2:
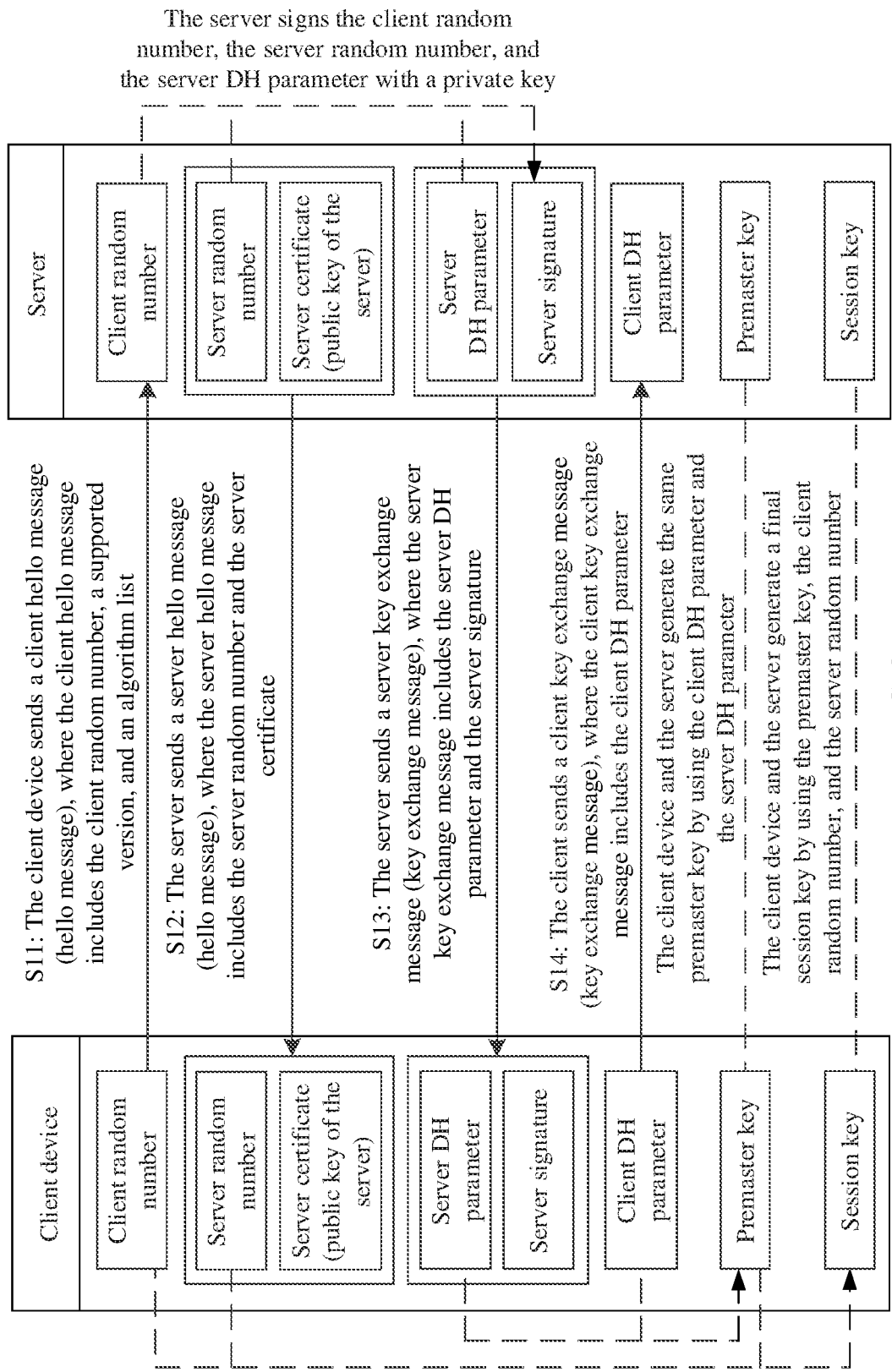
FIG. 2 is a flowchart of SSL/TLS handshake performed by two parties in communication according to an embodiment of this application.

Refer to FIG. 2. Take the ECDH algorithm as an example. When there is no man-in-the-middle, a process of SSL/TLS handshake performed by two communication parties is shown in FIG. 2, including the following steps S11 to S14.

Step S11: A client device sends a client hello message to a server, where the client hello message includes a client random number, a version supported by the client, and an algorithm list.

Step S12: The server sends a server random number and a server certificate to the client device. The server certificate includes a public key of the server.

Step S13: The server sends a server DH parameter and a server signature to the client device. The server signature is a signature obtained through signing, by the server, the client random number, the server random number, and the server DH parameter with a private key.

Step S14: The client device sends a client DH parameter to the server.

Then, the client device and the server generate a same premaster key by using the client DH parameter and the server DH parameter. The client device and the server generate a session key by using the premaster key, the client random number, and the server random number.

When a protection device such as a firewall device is located in a network between the client device and the server, to inspect an encrypted packet transmitted between the client device and the server, the protection device needs to decrypt the encrypted traffic. Currently, a mainstream solution is an inspection solution based on the SSL/TLS man-in-the-middle proxy. In the SSL/TLS man-in-the-middle proxy technology, as the name implies, the protection device needs to function as a proxy server to perform SSL/TLS handshake with the client device. In addition, the protection device functions as a proxy client to perform SSL/TLS handshake with the server.

Figure 3A:
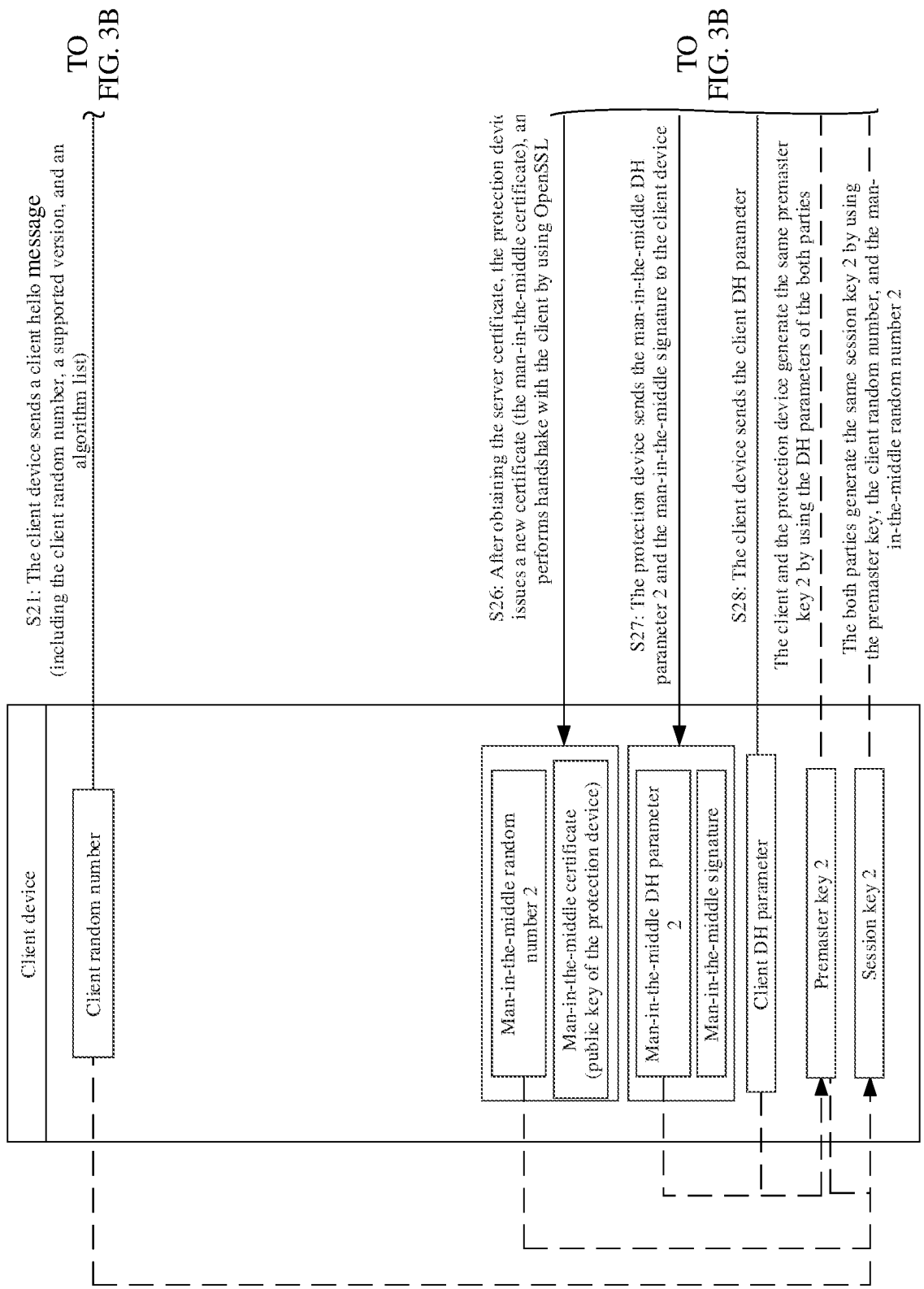
FIG. 3A to FIG. 3C are a flowchart of an inspection solution based on an SSL/TLS man-in-the-middle proxy according to an embodiment of this application.
Figure 3B:
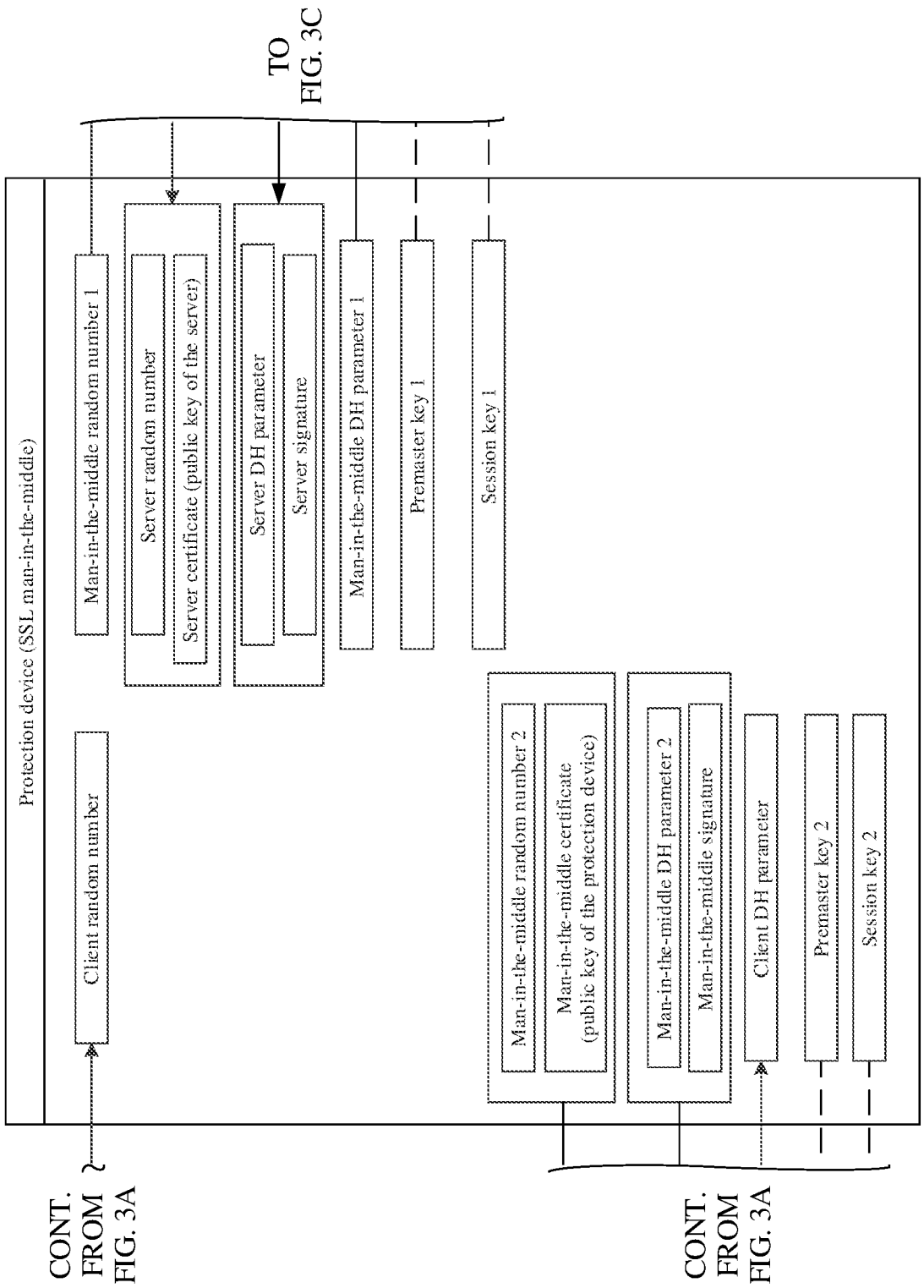
Figure 3C:
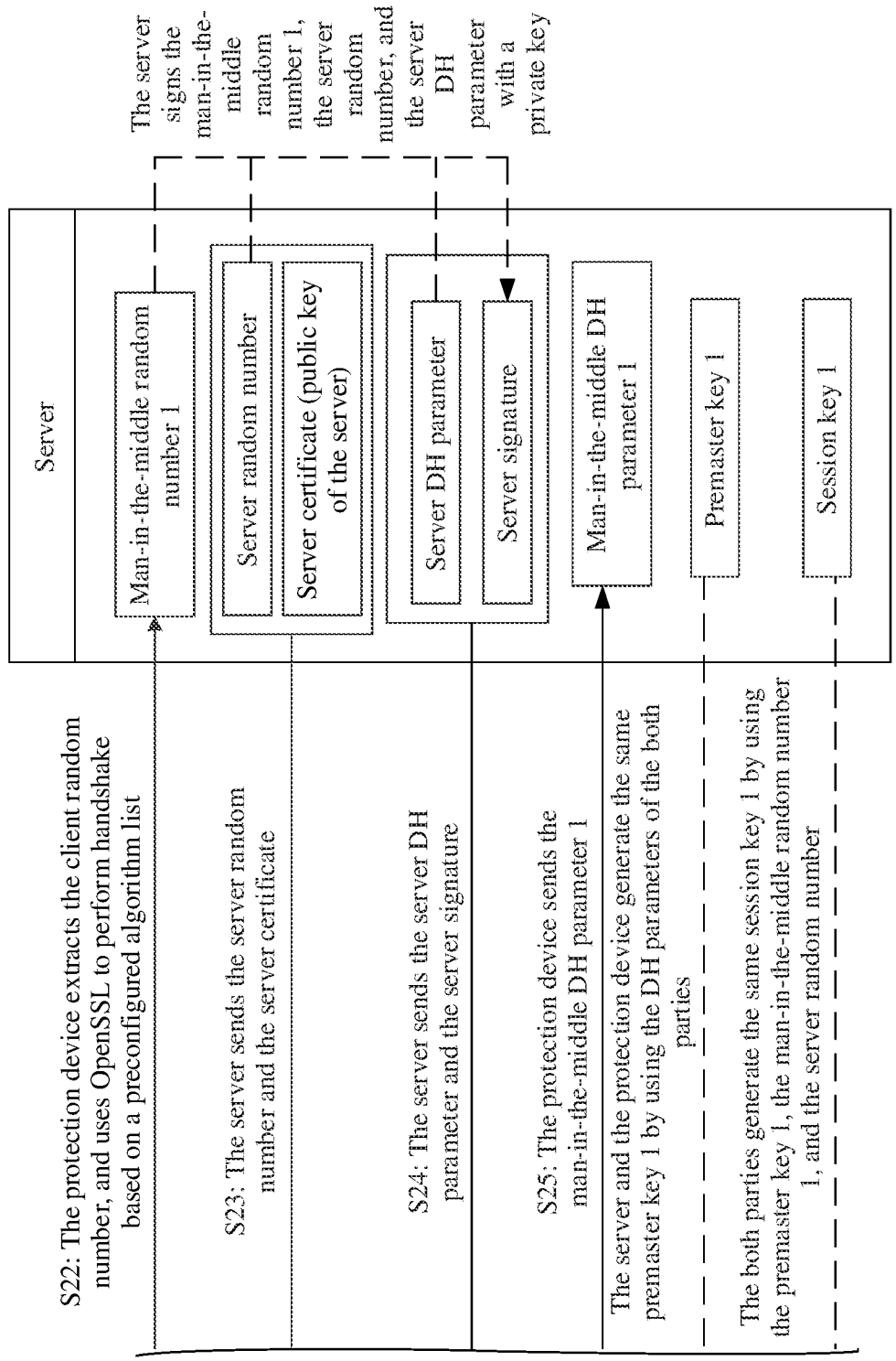

In some researches, a protection device is used as an endpoint in SSL/TLS session, and the protection device independently separately performs handshake with a real server and a real client. Information required for handshake performed by the protection device is automatically generated by SSL library software, for example, OpenSSL (an open-source software library). Specifically, FIG. 3A to FIG. 3C are a flowchart of the inspection solution based on the SSL/TLS man-in-the-middle proxy. The method shown in FIG. 3A to FIG. 3C includes the following step S21 to step S28. In the procedure shown in FIG. 3A to FIG. 3C, a man-in-the-middle DH parameter 1, a man-in-the-middle DH parameter 2, a man-in-the-middle random number 1, and a man-in-the-middle random number 2 are required when the protection device performs handshake. The man-in-the-middle DH parameter 1, the man-in-the-middle DH parameter 2, the man-in-the-middle random number 1, and the man-in-the-middle random number 2 are generated through complex computation performed by SSL library software.

Step S21: The client device sends a client hello message to the server. The client hello message contains a client random number, a supported version, and an algorithm list.

Step S22: The protection device receives the client hello message. The protection device extracts the client random number from the client hello message, and uses OpenSSL to perform handshake with the server based on a preconfigured algorithm list.

Step S23: The server sends a server random number and a server certificate to the client device, and the protection device receives the server random number and the server certificate. The server certificate includes a public key of the server.

Step S24: The server sends a server DH parameter and a server signature to the client device. The server signature is a signature obtained through signing, by the server, the client random number, the server random number, and the server DH parameter with a private key.

Step S25: The protection device sends the man-in-the-middle DH parameter 1 to the server.

Then, the server and the protection device generate a same premaster key 1 by using the DH parameters (the man-in-the-middle DH parameter 1 and the server DH parameter) of both parties. The server and the protection device generate a same session key 1 by using the premaster key 1, the man-in-the-middle random number 1, and the server random number.

Step S26: After obtaining the server certificate, the protection device issues a new certificate (a man-in-the-middle certificate), and performs handshake with the client device by using OpenSSL.

Step S27: The protection device sends the man-in-the-middle DH parameter 2 and a man-in-the-middle signature to the client device.

Step S28: The client device sends a client DH parameter to the server, and the protection device receives the client DH parameter.

Then, the client device and the protection device generate a same premaster key 2 by using the DH parameters (the client DH parameter and the man-in-the-middle DH parameter 2) of both parties. Then, the client device and the protection device generate the same session key 2 by using the premaster key, the client random number, and the man-in-the-middle random number 2.

In a research process, it is found that the SSL/TLS man-in-the-middle solution shown in FIG. 3A to FIG. 3C has some problems. In terms of efficiency, in the solution shown in FIG. 3A to FIG. 3C, the protection device needs to rely on OpenSSL or other open-source software when performing SSL/TLS handshake. Such open-source software usually has problems of low performance and high resource usage. Specifically, many parameters are used in the entire SSL handshake interaction process. In the solution shown in FIG. 3A to FIG. 3C, the protection device generates and maintains the parameters by using OpenSSL. For the protection device, it is better to reuse the foregoing parameters, for example, directly reuse the parameters generated by the client device or the server instead of generating parameters. However, in the solution shown in FIG. 3A to FIG. 3C, processes of interaction between the protection device and the two sides are separated and not associated. Parameters required for handshake are all generated by SSL library software, and parameters cannot be reused. Further, each communication party needs to complete complex computation to obtain an asymmetric key, resulting in huge computation overheads. In terms of security and compatibility, in the solution shown in FIG. 3A to FIG. 3C, an insecure algorithm may be agreed in a handshake phase, resulting in reduced security in a data transmission phase. Forcible configuration of a high-security algorithm may lead to a compatibility issue that causes negotiation failure after the protection device is added as a man-in-the-middle when the client device and server can use a low-security algorithm that meets requirements for negotiation.

In view of the security and compatibility issue and poor efficiency of the solution shown in FIG. 3A to FIG. 3C, an embodiment of this application provides a stateless SSL man-in-the-middle solution, to associate procedures of interaction between a protection device and two parties. In this way, parameters of the two parties in communication can be reused, and computation caused by independently generating parameters by the protection device is reduced. As a result, resource usage of the protection device can be reduced, and processing efficiency of the protection device serving as an SSL man-in-the-middle proxy can be greatly improved.

An application scenario provided in an embodiment of this application is described with reference to FIG. 4.

Figure 4:
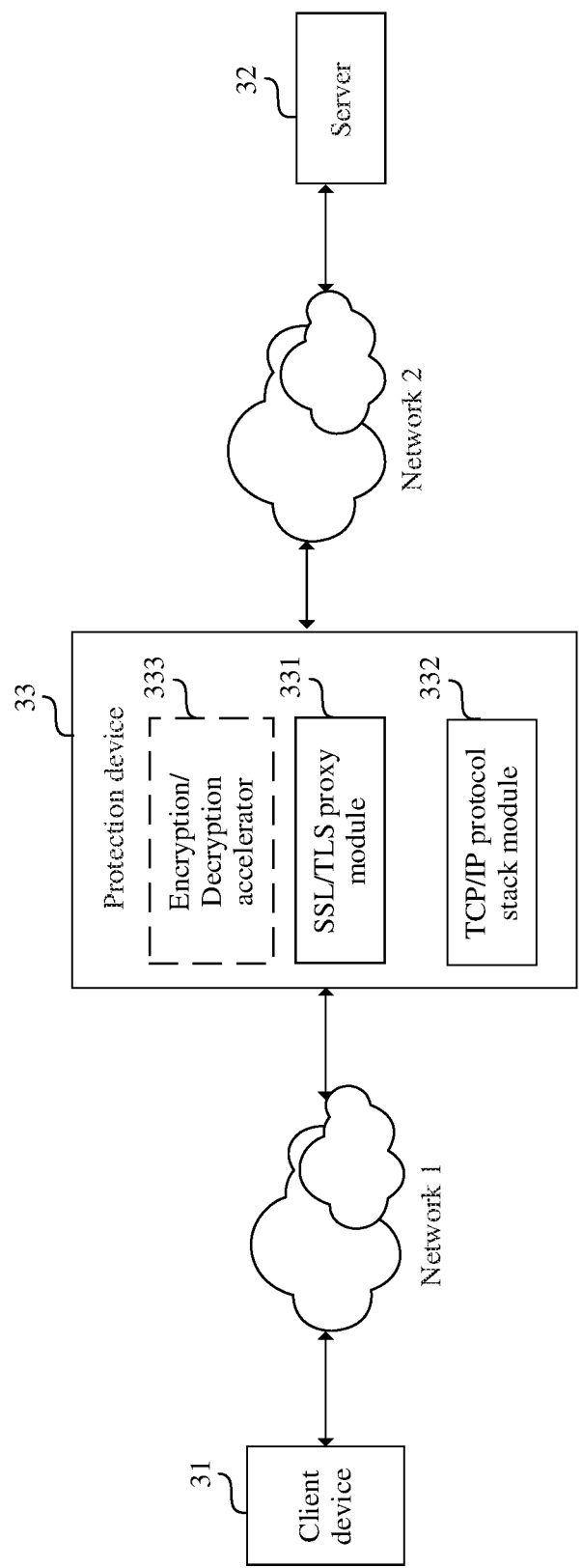
FIG. 4 is a schematic diagram of a typical application scenario according to an embodiment of this application.

Refer to FIG. 4. FIG. 4 is a schematic diagram of a typical application scenario according to an embodiment of this application. The application scenario includes a client device 31, a server 32, and a protection device 33. The following separately describes the client device 31, the server 32, and the protection device 33.

(1) Client Device 31

The client device 31 is a device that initiates access in an internet. For example, the client device 31 is a terminal device on which browser software is installed. The client device 31 includes but is not limited to a personal computer, a mobile phone, a server, a notebook computer, an IP phone, a camera, a tablet computer, a wearable device, and the like. For example, the client device 31 is an office device of an employee in an enterprise. In an actual network system, optionally, there are a large quantity of client devices. For brevity, a case in which there is one client device 31 is used as an example for description in FIG. 4.

(2) Server 32

The server 32 is a device that provides a service in an internet. For example, the server 32 is a web server, and the server 32 is configured to provide, for browser software in the client device 31, a resource required for web page access. For another example, the server 32 is a financial server, and the server 32 is configured to provide, for financial client software in the client device 31, a resource required by a personal financial service (such as bank account management and financial product purchase).

Data transmission between the client device 31 and the server 32 may be bidirectional. In other words, the client device 31 can send data to the server 32, or the server 32 can send data to the client device 31.

(3) Protection Device 33

The protection device 33 is deployed between the client device 31 and the server 32. A deployment manner of the protection device 33 includes but is not limited to in-line deployment, off-line deployment, and the like. The protection device 33, the client device 31, and the server 32 are connected by using a network.

The protection device 33 is configured to implement an SSL/TLS man-in-the-middle proxy for access traffic in a network, and perform security detection after locally decrypting encrypted traffic. Security detection includes but is not limited to intrusion prevention system (IPS) detection and antivirus (AV) detection. The protection device 33 includes but is not limited to a firewall, an intrusion detection system (IDS) device, an IPS device, a security gateway, a unified threat management (UTM) device, a server, a host, a personal computer, or the like.

Optionally, the protection device 33 includes an SSL/TLS proxy module 331 and a TCP/IP protocol stack module 332. The SSL/TLS proxy module 331 is configured to execute a processing task of the SSL/TLS proxy, for example, perform an SSL/TLS handshake with a server in place of a client, or perform an SSL/TLS handshake with a client in place of a server. The TCP/IP protocol stack module 332 is configured to transmit a message based on a TCP/IP protocol.

Optionally, the protection device further includes an encryption/decryption accelerator 333. The encryption/decryption accelerator 333 is configured to accelerate, by applying algorithms to hardware, encryption parameter generation, session key generation, encryption, and decryption, to improve performance of the protection device.

Figure 5:
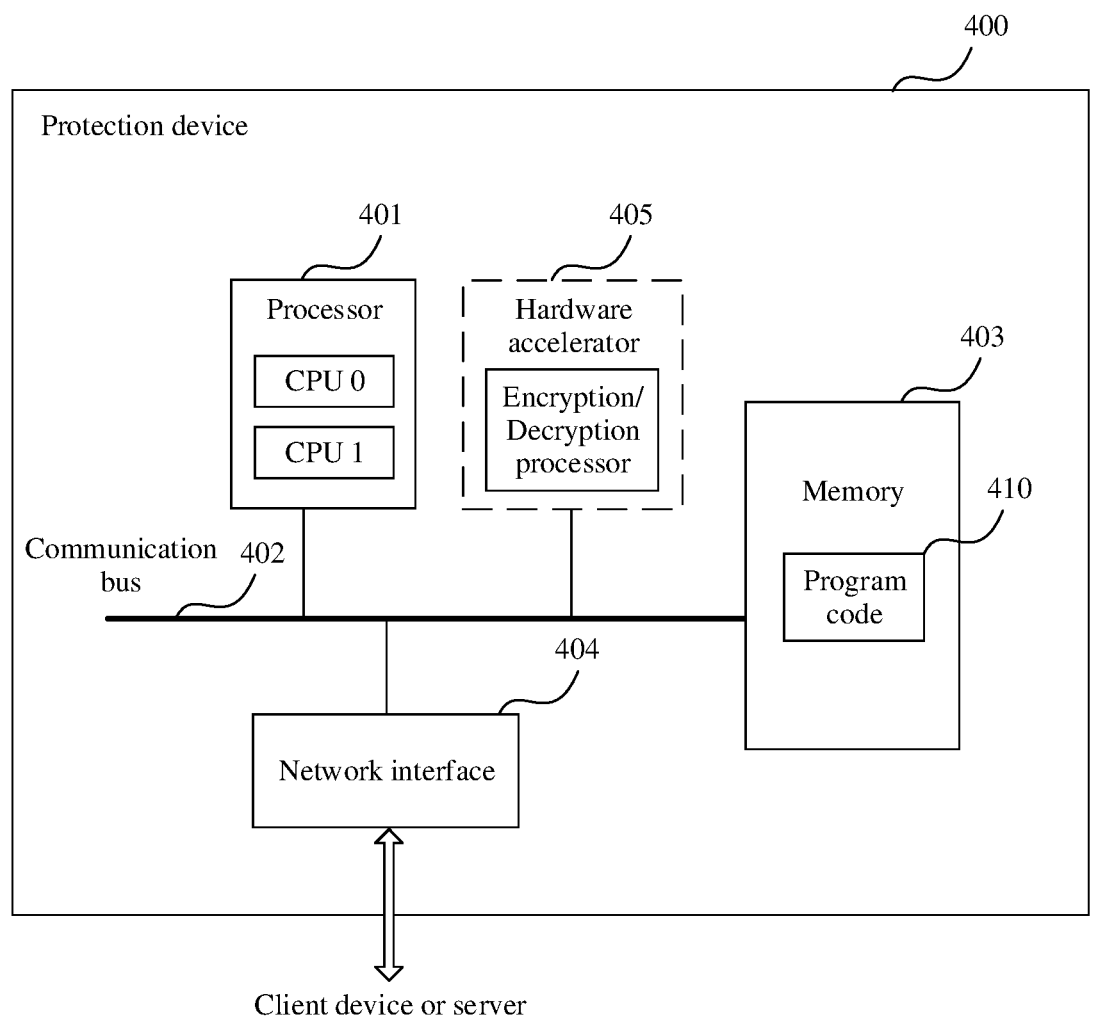
FIG. 5 is a schematic diagram of a structure of a protection device according to an embodiment of this application.

FIG. 5 is a schematic diagram of a structure of a protection device according to an embodiment of this application. Optionally, the protection device having the structure shown in FIG. 5 is the protection device 33 in FIG. 4.

Refer to FIG. 5. FIG. 5 is a schematic diagram of a structure of a protection device 400 according to an example embodiment of this application. The protection device 400 is implemented by using a general bus architecture.

The protection device 400 includes at least one processor 401, a communication bus 402, a memory 403, and at least one network interface 404.

The processor 401 is, for example, a general-purpose central processing unit (CPU), a network processor (NP), a graphics processing unit (GPU), a neural-network processing unit (NPU), a data processing unit (DPU), a microprocessor, or one or more integrated circuits configured to implement the solutions of this application. For example, the processor 401 includes an application-specific integrated circuit (ASIC), a programmable logic device (PLD), or a combination thereof. For example, the PLD may be a complex programmable logic device (CPLD), a field-programmable gate array (FPGA), generic array logic (GAL), or any combination thereof.

The communication bus 402 is configured to transmit information between the foregoing components. The communication bus 402 may be classified into an address bus, a data bus, a control bus, and the like. For ease of indication, the bus is indicated by only one thick line in FIG. 5. However, it does not indicate that there is only one bus or only one type of bus.

The memory 403 stores program code 410 used for implementing a method embodiment of this application. The memory 403 may be, for example, a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 403 is not limited thereto. For example, the memory 403 exists independently, and is connected to the processor 401 through the communication bus 402. The memory 403 may be alternatively integrated with the processor 401.

The network interface 404 is any apparatus such as a transceiver and is configured to communicate with another device or a communication network. The network interface 404 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

In a specific implementation, in an embodiment, the processor 401 may include one or more CPUs, for example, a CPU 0 and a CPU 1 shown in FIG. 5.

Optionally, the protection device 400 further includes a hardware accelerator 405. The hardware accelerator 405 is configured to: generate a man-in-the-middle DH parameter, generate a session key, decrypt an original encrypted packet, or encrypt inspected data. The hardware accelerator 405 accelerates execution of these steps by applying algorithms to hardware. The hardware accelerator 405 supports at least one algorithm. An algorithm supported by the hardware accelerator 405 includes but is not limited to an algorithm used for generating a DH parameter, a session key, a random number, and the like in a session negotiation phase of an SSL/TLS communication process, and an algorithm used for encryption and decryption in a data transmission phase of the SSL/TLS communication process. For example, the hardware accelerator 405 supports a DH algorithm (for example, an ECDH algorithm) and the like. In some embodiments, the hardware accelerator 405 includes an encryption/decryption processor. For example, the hardware accelerator 405 includes but is not limited to a field-programmable gate array (FPGA), an application-specific integrated circuit (ASIC), a system on chip (SoC), a central processing unit (CPU), a network processor (NP), a digital signal processor (DSP), a micro controller (MCU), a programmable controller (PLD), or another integrated chip.

Each of the processor 401 and the hardware accelerator 405 is, for example, a single-core processor (single-CPU), or a multi-core processor (multi-CPU). The processor herein may be one or more devices, circuits, and/or processing cores configured to process data (for example, computer program instructions).

In a specific implementation, in an embodiment, the protection device 400 may further include an output device and an input device. The output device communicates with the processor 401, and may display information in a plurality of manners. For example, the output device may be a liquid crystal display (LCD), a light emitting diode (LED) display device, a cathode ray tube (CRT) display device, or a projector. The input device communicates with the processor 401, and can receive an input from a user in a plurality of manners. For example, the input device may be a mouse, a keyboard, a touchscreen device, or a sensor device.

Figure 6A:
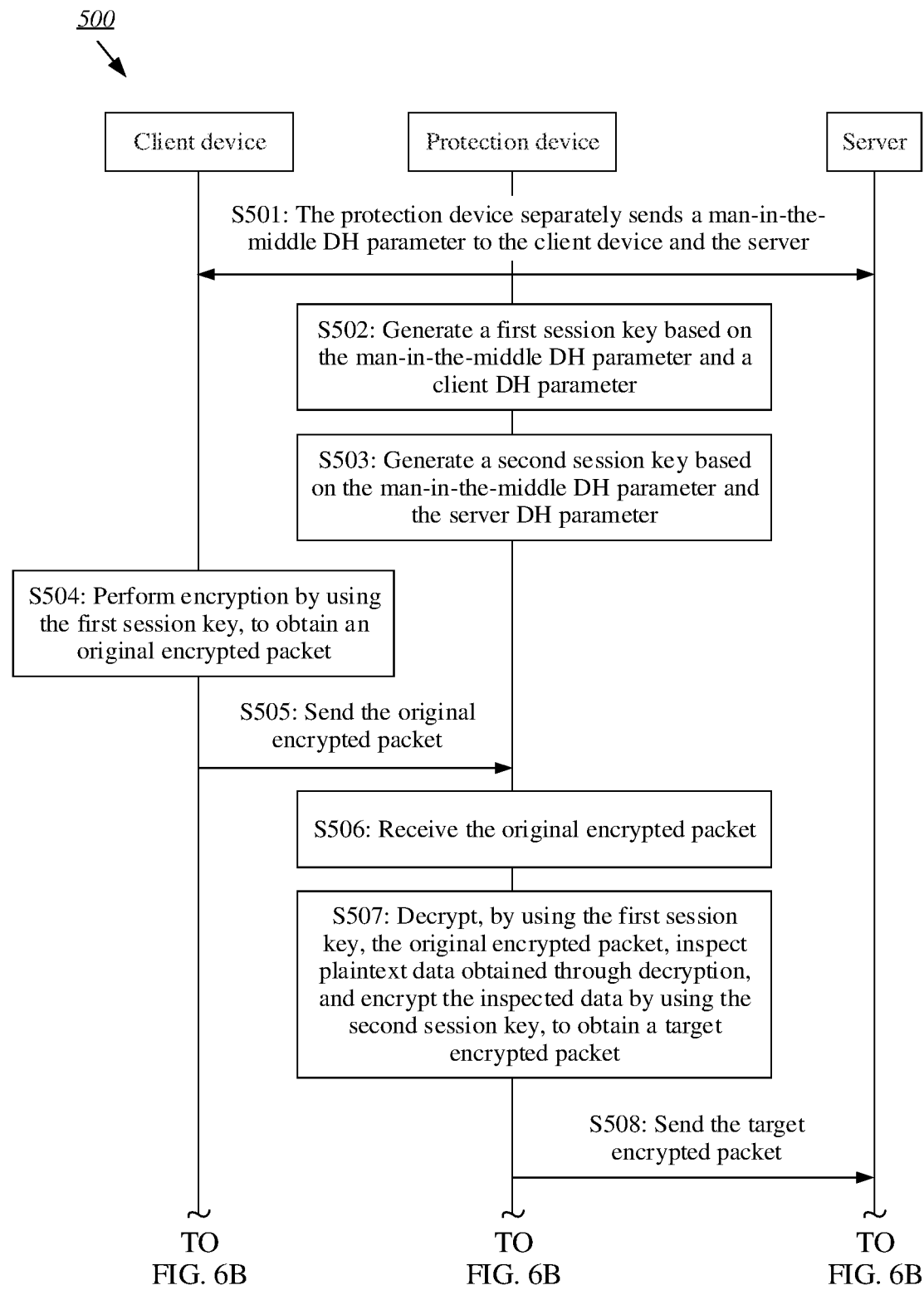
FIG. 6A and FIG. 6B are a flowchart of an encrypted packet inspection method according to an embodiment of this application.
Figure 6B:
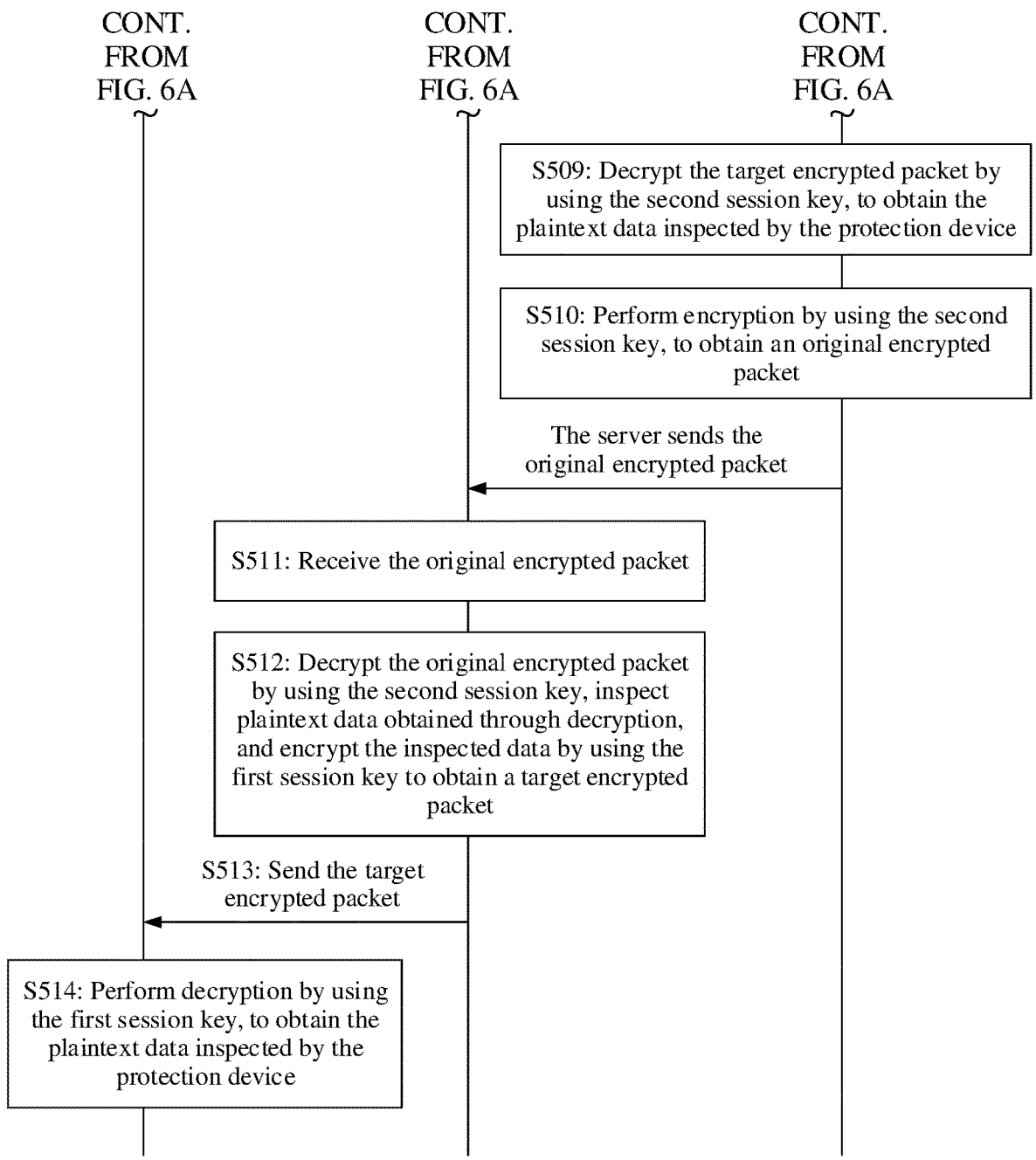

In a procedure described in FIG. 6A and FIG. 6B, the processor 401 is configured to perform the following operations after reading the program code 410 stored in the memory 403. The processor 401 indicates the network interface 404 to separately send a man-in-the-middle DH parameter to the client device and the server, where the man-in-the-middle DH parameter is a DH parameter generated by the processor 401 or the hardware accelerator 405. The processor 401 generates a first session key based on the man-in-the-middle DH parameter and a client DH parameter. The processor 401 generates a second session key based on the man-in-the-middle DH parameter and the server DH parameter. The network interface 404 is configured to receive an original encrypted packet. If the original encrypted packet is from the client device, the processor 401 uses the first session key to decrypt the original encrypted packet, inspects plaintext data obtained through decryption, and uses the second session key to encrypt the inspected data to obtain a target encrypted packet; and the processor 401 indicates the network interface 404 to send the target encrypted packet to the server. If the original encrypted packet is from the server, the processor 401 uses the second session key to decrypt the original encrypted packet, inspects plaintext data obtained through decryption, and uses the first session key to encrypt the inspected data to obtain a target encrypted packet. The processor 401 indicates the network interface 404 to send the target encrypted packet to the client device.

In some embodiments, the network interface 404 is configured to receive an original client key exchange message from the client device. The processor 401 is configured to: after reading the program code 410 stored in the memory 403, perform the following operations: replacing a client DH parameter in the original client key exchange message with a man-in-the-middle DH parameter, to obtain a target client key exchange message; and indicating the network interface 404 to send the target client key exchange message to the server.

In some embodiments, the network interface 404 is configured to receive an original server key exchange message from the server. The processor 401 is configured to: after reading the program code 410 stored in the memory 403, perform the following operations: replacing a server DH parameter in the original server key exchange message with a man-in-the-middle DH parameter, to obtain a target server key exchange message; and indicating the network interface 404 to send the target server key exchange message to the client device.

In some embodiments, the processor 401 is further configured to replace a server signature in the original server key exchange message with a man-in-the-middle signature.

In some embodiments, after reading the program code 410 stored in the memory 403, the processor 401 performs the following operations: generating a first premaster key by using the man-in-the-middle DH parameter and the client DH parameter; generating the first session key by using the first premaster key, the client random number, and the server random number; generating the second premaster key by using the man-in-the-middle DH parameter and the server DH parameter; and generating a second session key by using the second premaster key, the client random number, and the server random number.

In some embodiments, the processor 401 is configured to extract a client random number from an original client hello message received by the network interface 404, and extract a server random number from an original server hello message received by the network interface 404.

In some embodiments, the network interface 404 is configured to receive an original client hello message from the client device, and after reading the program code 410 stored in the memory 403, the processor 401 performs the following operations: deleting an identifier of a first algorithm in an algorithm list from the original client hello message, to obtain a target client hello message; and indicating the network interface 404 to send the target client hello message to the server.

In some embodiments, the processor 401 is configured to: decrypt the original encrypted packet by using the first session key according to a second algorithm; and encrypt inspected data according to the second algorithm by using the second session key, to obtain the target encrypted packet; and after reading the program code 410 stored in the memory 403, the processor 401 performs the following operations: decrypting the original encrypted packet according to the second algorithm by using the second session key; and encrypting the inspected data according to the second algorithm by using the first session key, to obtain the target encrypted packet.

In some embodiments, the network interface 404 is further configured to receive the original server hello message from the server; and after reading the program code 410 stored in the memory 403, the processor 401 performs the following operations: replacing a server certificate in the original server hello message with a man-in-the-middle certificate, to obtain the target server hello message; and indicating the network interface 404 to send the target server hello message to the client device.

In some embodiments, if the hardware accelerator 405 is configured to generate a session key, the processor 401 inputs the man-in-the-middle DH parameter and the client DH parameter into the hardware accelerator 405, and receives the first session key generated by the hardware accelerator 405; and the processor 401 inputs the man-in-the-middle DH parameter and the server DH parameter into the hardware accelerator 405, and receives the second session key generated by the hardware accelerator 405.

In some embodiments, if the hardware accelerator 405 is configured to decrypt the original encrypted packet, the processor 401 inputs the first session key and the original encrypted packet into the hardware accelerator 405, and receives the plaintext data obtained through decryption by the hardware accelerator 405; and the processor 401 inputs the second session key and the original encrypted packet into the hardware accelerator 405, and receives the plaintext data obtained through decryption by the hardware accelerator 405.

In some embodiments, if the hardware accelerator 405 is configured to encrypt the inspected data, the processor 401 inputs the second session key and the inspected data into the hardware accelerator 405, and receives the target encrypted packet obtained through encryption by the hardware accelerator 405; and the processor 401 inputs the first session key and the inspected data into the hardware accelerator 405, and receives the target encrypted packet obtained through encryption by the hardware accelerator 405.

For more details of implementing the foregoing functions by the processor 401, the network interface 404, the memory 403, the hardware accelerator 405, and the like, refer to descriptions in the following method embodiments.

The following describes an encrypted packet inspection method according to an embodiment of this application with reference to FIG. 6A and FIG. 6B. FIG. 6A and FIG. 6B are a flowchart of an encrypted packet inspection method 500 according to an embodiment of this application. The method 500 includes step S501 to step S514.

Optionally, a network deployment scenario including a client device, a server, and a protection device in the method 500 is the same as that shown in FIG. 4. The client device in the method 500 is the client device 31 in FIG. 4, the server in the method 500 is the server 32 in FIG. 4, and the protection device in the method 500 is the protection device 33 in FIG. 4.

Optionally, the protection device in the method 500 has a structure shown in FIG. 5.

Interaction entities in the method 500 include three types of devices: a protection device, a client device, and a server. The interaction between the three types of devices requires a parameter corresponding to each type of device. In order to distinguish and describe parameters corresponding to different devices, in this embodiment, words such as "man-in-the-middle", "client", and "server" are used to represent parameters corresponding to different devices. For example, a "man-in-the-middle DH parameter" is used to represent a DH parameter generated by the protection device, a "client DH parameter" is used to represent a DH parameter generated by the client device, and a "server DH parameter" is used to represent a DH parameter generated by the server.

When the three types of devices interact with each other, the protection device functions as a man-in-the-middle between the client device and the server. The protection device forwards messages exchanged between the client device and the server, and modifies the messages exchanged between the client device and the server. To distinguish between a message before modification and a message after modification by the protection device, in this embodiment, words such as "original" and "target" are used to represent the message before modification by the protection device and the message after modification by the protection device. For example, "original encrypted packet" refers to an encrypted packet received by the protection device, and the "target encrypted packet" refers to an encrypted packet obtained after the protection device performs processing such as decryption, inspection, and encryption.

Step S501: The protection device separately sends a man-in-the-middle DH parameter to the client device and the server.

The man-in-the-middle DH parameter is a DH parameter generated by the protection device. In some embodiments, the man-in-the-middle DH parameter is generated by the protection device performing a large-number calculation. The DH parameter is a negotiation parameter in a DH algorithm. The DH algorithm is a key agreement algorithm used in SSL/TLS. The DH algorithm includes but is not limited to an ECDH algorithm.

After the protection device generates the man-in-the-middle DH parameter, the protection device sends the man-in-the-middle DH parameter to the client device, so that the protection device and the client device subsequently generate a session key based on DH parameters of both parties. In addition, the protection device sends the man-in-the-middle DH parameter to the server, so that the protection device and the server subsequently generate a session key based on DH parameters of both parties. The man-in-the-middle DH parameter sent by the protection device to the client device is the same as the man-in-the-middle DH parameter sent by the protection device to the server. In some embodiments, the man-in-the-middle DH parameter sent by the protection device to the client device and the server is specifically a public part of the DH parameter generated by the protection device. The public part in the DH parameter is a public key in the DH algorithm (such as the ECDH algorithm).

In some embodiments, the protection device modifies original handshake messages such as an original server key exchange message and an original client key exchange message, to implement step S501. Specifically, refer to FIG.

7. For example, step S501 is implemented by implementing a procedure shown in FIG. 7. The procedure shown in FIG. 7 describes step S501 in the procedure shown in FIG. 6A. The procedure shown in FIG. 7 includes the following step S5010 to step S5019.

Step S5010: The server generates an original server key exchange message and sends the original server key exchange message to the client device.

An original server key exchange message includes a server DH parameter. The server DH parameter is, for example, a public part of a DH parameter generated by the server. In some embodiments, the original server key exchange message includes a server signature. The server signature is a digital signature generated by the server. Specifically, the server signature is a signature obtained through signing, by the server, the server DH parameter with a private key of the server.

Step S5011: The protection device receives the original server key exchange message from the server.

Step S5012: The protection device replaces the server DH parameter in the original server key exchange message with a man-in-the-middle DH parameter, to obtain a target server key exchange message, where the target server key exchange message includes the man-in-the-middle DH parameter.

In addition, the protection device replaces the server signature in the original server key exchange message with a man-in-the-middle signature. The target server key exchange message includes the man-in-the-middle signature.

The man-in-the-middle signature is a digital signature generated by the protection device. Specifically, the protection device performs digest calculation, and performs encryption after signing a client random number, a server random number, and the man-in-the-middle DH parameter with a private key of the protection device. In this way, the man-in-the-middle signature can be obtained.

Step S5013: The protection device sends the target server key exchange message to the client device.

Step S5014: The client device receives the target server key exchange message from the protection device, and the client device obtains the man-in-the-middle DH parameter from the target server key exchange message.

In some embodiments, the client device obtains the man-in-the-middle signature from the target server key exchange message. The client device verifies the man-in-the-middle signature. If the man-in-the-middle signature verification succeeds, the client device saves the man-in-the-middle DH parameter and sends an original client key exchange message.

Step S5015: The client device generates the original client key exchange message and sends the original client key exchange message to the server, where the original client key exchange message includes a client DH parameter.

The client DH parameter in the original client key exchange message is, for example, a public part of the DH parameter generated by the client.

Step S5016: The protection device receives the original client key exchange message from the client device.

Step S5017: The protection device replaces the client DH parameter in the original client key exchange message with the man-in-the-middle DH parameter, to obtain the target client key exchange message, where the target client key exchange message includes the man-in-the-middle DH parameter.

Step S5018: The protection device sends the target client key exchange message to the server.

Step S5019: The server receives the target client key exchange message from the protection device, and the server obtains the man-in-the-middle DH parameter from the target client key exchange message.

By implementing the communication procedure described in the foregoing step S5010 to step S5019, a manner similar to stateless processing on a device side is provided, whereby resource overheads of the protection device can be reduced due to parameter reuse, and compatibility and security can be ensured after the man-in-the-middle is added. The following describes a technical principle for achieving this effect.

Refer to FIG. 3A to FIG. 3C. In a conventional solution for implementing an SSL man-in-the-middle proxy, a protection device needs to separately maintain a status of connection with a client device and a server. When the protection device performs handshake with the client, the protection device needs to generate each complete handshake message sent to the client device. When the protection device performs handshake with the server, the protection device needs to generate each complete handshake message sent to the server. A processing procedure is complex, and therefore the protection device may enter into a kernel mode.

However, in this embodiment, in step S5010 to step S5019, because handshake is performed with a real client and a real server, the protection device only needs to generate a small quantity of parameters and perform packet parsing and content replacement based on handshake messages sent by the two sides. Then handshake with the two sides can be performed. In this way, resource overheads can be reduced. Specifically, when the protection device performs handshake with the client, the protection device performs steps such as DH parameter replacement and signature modification based on a server key exchange message sent by a real server, to send the server key exchange message to the client. When the protection device performs handshake with the server, the protection device performs steps such as DH parameter replacement based on a client key exchange message sent by a real client, to send the client key exchange message to the server. In this way, the protection device does not need to perform SSL handshake with both sides respectively, and a complex OpenSSL processing procedure is not required.

Return to the procedure shown in FIG. 6A. Step S502: The protection device generates a first session key based on the man-in-the-middle DH parameter and the client DH parameter.

The client DH parameter is a DH parameter generated by the client device. The first session key is a session key used between the protection device and the client device.

In some embodiments, the first session key is generated by using a premaster secret, the client random number, and the server random number. Specifically, the protection device generates the first premaster secret by using the man-in-the-middle DH parameter and the client DH parameter; and the protection device generates the first session key by using the first premaster secret, the client random number, and the server random number. The client random number is a random number generated by the client device, and the server random number is a random number generated by the server.

Step S503: The protection device generates a second session key based on the man-in-the-middle DH parameter and the server DH parameter.

The server DH parameter is a DH parameter generated by the server. The second session key is a session key used between the protection device and the server.

In some embodiments, the second session key is generated by using the premaster secret, the client random number, and the server random number. Specifically, the protection device generates a second premaster secret by using the man-in-the-middle DH parameter and the server DH parameter; and the protection device generates a second session key by using a second premaster secret, the client random number, and the server random number.

The protection device reuses the man-in-the-middle DH parameter in step S501 to step S503. This greatly reduces operation overheads and greatly increases an SSL/TLS handshake speed. The following explains a technical principle of this effect with reference to FIG. 3A to FIG. 3C. In a conventional manner, when functioning as an SSL/TLS man-in-the-middle proxy, the protection device needs to generate two man-in-the-middle DH parameters for the client device and the server. Refer to FIG. 3A to FIG. 3C. Specifically, when the protection device performs SSL/TLS handshake with the client device, the protection device generates a man-in-the-middle DH parameter 1 and sends the man-in-the-middle DH parameter 1 to the client device; and when the protection device performs SSL/TLS handshake with the server, the protection device generates a man-in-the-middle DH parameter 2 and sends the man-in-the-middle DH parameter 2 to the server. The man-in-the-middle DH parameter 1 sent by the protection device to the client device and the man-in-the-middle DH parameter 2 sent by the protection device to the server are two DH parameters, and need to be separately generated through DH computation. Therefore, the protection device needs to perform a large amount of complex computation, resulting in huge performance consumption. However, in this embodiment, the protection device sends a same man-in-the-middle DH parameter to the client device and the server respectively, and uses the same man-in-the-middle DH parameter when negotiating session keys with the client device and the server. In this case, the DH parameter is reused and computation required for generating the DH parameter is reduced. Especially, when the DH parameter is generated through large-number calculation, large-number calculation overheads (that is, overheads of generating the man-in-the-middle DH parameter) are significantly reduced. This alone can improve a creation speed by nearly 20%, and processing performance of the entire system can be greatly improved.

An SSL/TLS communication process consists of a session negotiation phase and data transmission phase. Step S501 to step S503 in FIG. 6A are example steps performed in the session negotiation phase. Steps performed in the data transmission phase are described below by using step S504 to step S514 in FIG. 6A and FIG. 6B as an example. The data transmission phase includes a scenario in which the client sends data to the server or a scenario in which the server sends data to the client. For a transmission process in the scenario in which the client sends data to the server, refer to the following step S504 to step S509. For a transmission process in the scenario in which the server sends data to the client, refer to the following step S510 to step S514.

Step S504: When the client device is to send data to the server, the client device encrypts service data by using the first session key, to obtain an original encrypted packet.

Step S505: The client device sends the original encrypted packet.

Step S506: The protection device receives the original encrypted packet from the client device.

Step S507: The protection device decrypts the original encrypted packet from the client device by using the first session key, inspects plaintext data obtained through decryption, and encrypts the inspected data by using the second session key to obtain a target encrypted packet.

Step S508: The protection device sends the target encrypted packet to the server.

Step S509: The server decrypts the target encrypted packet by using the second session key, to obtain the plaintext data inspected by the protection device.

Step S510: When the server is to send data to the client device, the server encrypts the service data by using the second session key, to obtain the original encrypted packet; and the server sends an original encrypted packet.

Step S511: The protection device receives the original encrypted packet from the server.

Step S512: The protection device decrypts the original encrypted packet from the server by using the second session key, inspects plaintext data obtained through decryption, and encrypts the inspected data by using the first session key to obtain a target encrypted packet.

Step S513: The protection device sends the target encrypted packet to the client device.

Step S514: The client device decrypts the target encrypted packet by using the first session key, to obtain the plaintext data inspected by the protection device.

It should be noted that a sequence in which step S504 to step S509 are performed before step S510 to step S514 as shown in FIG. 6A and FIG. 6B is merely an example, and a sequence of performing step S504 to step S509 and step S510 to step S514 is not limited in this embodiment. In some embodiments, step S504 to step S509 and step S510 to step S514 are sequentially performed. For example, step S504 to step S509 are performed before step S510 to step S514. For another example, step S510 to step S514 are performed before step S504 to step S509. In some other embodiments, step S504 to step S509 and step S510 to step S514 are concurrently performed, that is, step S504 to step S509 and step S510 to step S514 are simultaneously performed.

According to the method provided in this embodiment, a process of performing SSL handshake between the protection device and the client device is associated with a process of performing SSL handshake between the protection device and the server. The protection device sends the same DH parameter to the client device and the server, and reuses the DH parameters on the two sides when generating the session keys. In this way, a computation amount caused by DH parameter generation is reduced, and resource usage of the protection device such as a firewall is reduced. This greatly increases an SSL handshake speed, and improves performance of the protection device.

In some embodiments, the protection device further deletes an unsupported algorithm from an algorithm list sent by the client, and forwards an algorithm list obtained through deletion to the server, so that the server selects an algorithm obtained through negotiation from the algorithm list that is obtained through deletion performed by the protection device and that is from the client. Therefore, an algorithm used for encryption and decryption by the protection device and the client is associated with an algorithm used for encryption and decryption by the protection device and the server.

Figure 8A:
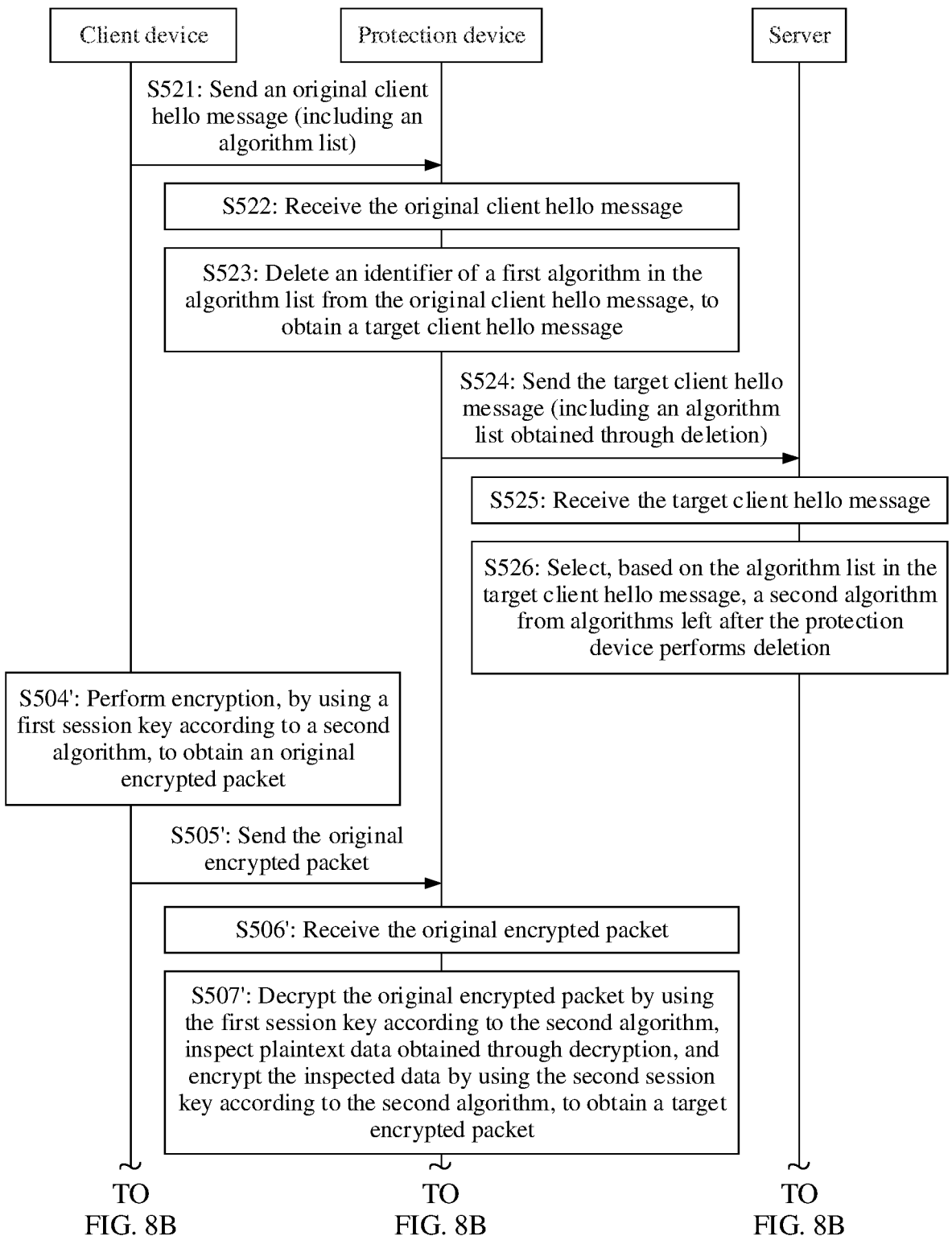
FIG. 8A and FIG. 8B are a flowchart of an encrypted packet inspection method according to an embodiment of this application.
Figure 8B:
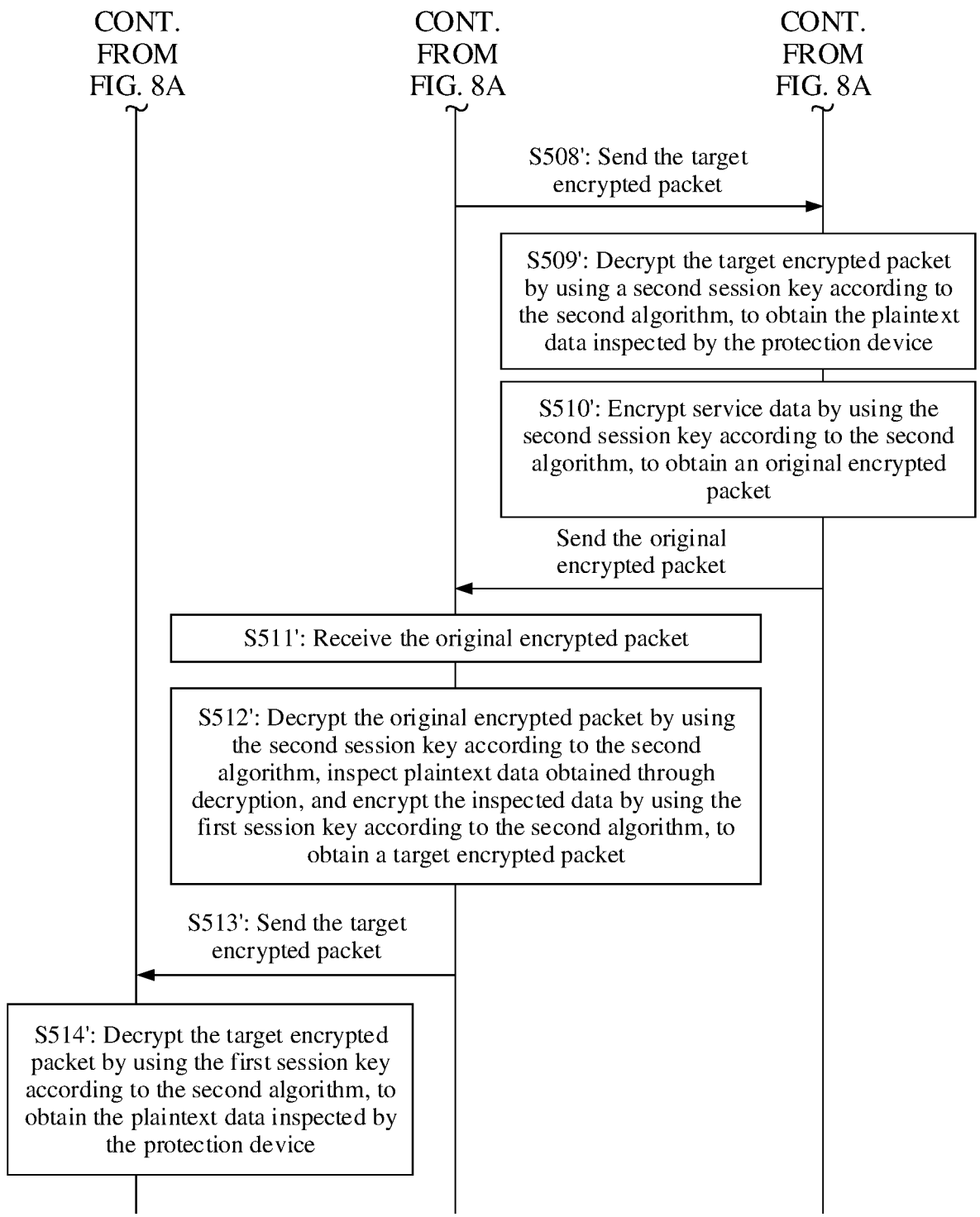

For example, refer to FIG. 8A and FIG. 8B. A process of algorithm deletion includes the following step S521 to step S526.

Step S521: The client device generates an original client hello message and sends the original client hello message.

The original client hello message is a handshake message in an SSL/TLS protocol. The original client hello message includes an algorithm list and a client random number. Both the algorithm list and the client random number in the original client hello message are generated by the client device.

The algorithm list in the original client hello message is used to describe at least one algorithm supported by the client device. The algorithm list includes an identifier of at least one algorithm. The algorithm list is used by the server to select an algorithm used for encryption and decryption in the data transmission phase. For example, the client hello message sent by the client device includes an algorithm list shown in the following Table 1. The algorithm list shown in Table 1 includes identifiers of five algorithms, and the five algorithms are all algorithms supported by the client device.

TABLE 1

| |
| --- |
| TLS_ECDHE_RSA_WITH_AES_256_GCM_SHA384 |
| TLS_ECDHE_RSA_WITH_AES_128_GCM_SHA256 |
| TLS_ECDHE_ECDSA_WITH_AES_128_GCM_SHA256 |
| TLS_RSA_WITH_RC4_128_SHA |
| TLS_RSA_WITH_AES_256_CBC_SHA |

Step S522: The protection device receives the original client hello message from the client device.

Step S523: The protection device deletes an identifier of a first algorithm in the algorithm list from the original client hello message, to obtain a target client hello message.

Step S524: The protection device sends the target client hello message to the server.

The first algorithm is an algorithm that is not supported by the protection device. The first algorithm is an algorithm used to encrypt and decrypt data.

The target client hello message is a message obtained through algorithm deletion performed by the protection device. The target client hello message includes an algorithm list. The algorithm list in the target client hello message includes an identifier of at least one algorithm other than the first algorithm, that is, an identifier of an algorithm left after the protection device performs deletion. The algorithm list in the target client hello message is used to describe at least one algorithm supported by both the client device and the protection device. Specifically, an algorithm left after deletion can be supported by both the client device and the protection device because an algorithm in the algorithm list sent by the client device is an algorithm supported by the client device, and the protection device deletes an algorithm that is not supported by the protection device from the algorithm list.

For example, the client device provides five algorithms shown in Table 1 for the server. For example, the client hello message received by the protection device includes the algorithm list shown in the Table 1. When checking whether the algorithm list in the client hello message includes an algorithm that is not supported by the protection device, the protection device finds that the protection device does not support the fourth algorithm "TLS_RSA_WITH_RC4_128_SHA" in Table 1. The protection device deletes the fourth algorithm "TLS_RSA_WITH_RC4_128_SHA" from the algorithm list of the client hello message, to obtain an algorithm list shown in the following Table 2. The algorithm list of the client hello message sent by the protection device to the server includes the algorithm list shown in Table 2. A relationship between the algorithm list shown in Table 2 and the algorithm list shown in Table 1 is that the algorithm list shown in Table 2 includes identifiers of four algorithms other than "TLS_RSA_WITH_RC4_128_SHA" in the algorithm list shown in Table 1. The four algorithms shown in Table 2 are algorithms supported by both the protection device and the client device. The algorithm identified by "TLS_RSA_WITH_RC4_128_SHA" is an example of the first algorithm.

TABLE 2

| |
| --- |
| TLS_ECDHE_RSA_WITH_AES_256_GCM_SHA384 |
| TLS_ECDHE_RSA_WITH_AES_128_GCM_SHA256 |
| TLS_ECDHE_ECDSA_WITH_AES_128_GCM_SHA256 |
| TLS_RSA_WITH_AES_256_CBC_SHA |

Step S525: The server receives the target client hello message.

Step S526: The server selects, based on the algorithm list in the target client hello message, a second algorithm from algorithms left after the protection device performs deletion.

The second algorithm is an algorithm obtained through negotiation performed by the three parties (the client device, the server, and the protection device) in a handshake phase. The second algorithm is an algorithm used by the three parties to encrypt and decrypt data in the data transmission phase. The second algorithm is an algorithm in the algorithm list in the target client hello message. In other words, the second algorithm is an algorithm corresponding to an algorithm identifier left after the identifier of the first algorithm is deleted from the algorithm list.

The second algorithm is an algorithm supported by the protection device, the client device, and the server. Specifically, the server selects, based on an algorithm supported by the server, the algorithm supported by the server (the second algorithm) from the algorithm list in the received client hello message.

For example, the client device sends the algorithm list that describes five algorithms and that is shown in Table 1. After deleting an identifier of one algorithm from the algorithm list, the protection device forwards, to the server, the algorithm list that describes four algorithms and that is shown in Table 2. After the server receives the algorithm list shown in Table 2, the server finds that the server supports the third algorithm TLS_ECDHE_ECDSA_WITH_AES_128_GCM_SHA256 in the four algorithms shown in Table 2. The server selects the third algorithm TLS_ECDHE_ECDSA_WITH_AES_128_GCM_SHA256. The algorithm identified by "TLS_ECDHE_ECDSA_WITH_AES_128_GCM_SHA256" is an example of the second algorithm.

In some embodiments, the server stores a list of algorithms supported by the server. The server compares the algorithm list in the target client hello message with a locally stored algorithm list. If an algorithm that exists in both the algorithm list in the target client hello message and the locally stored algorithm list is found, the server selects the algorithm (the second algorithm).

When the handshake phase is implemented by performing the foregoing step S521 to step S526, the subsequent data transmission phase is implemented, for example, by performing the following step S504' to step S514'. The following step S504' to step S514' respectively correspond to step S504 to step S514 in the process shown in FIG. 6A and FIG. 6B.

Step S504': When the client device is to send data to the server, the client device encrypts service data according to the second algorithm by using the first session key, to obtain an original encrypted packet.

In some embodiments, the protection device determines, based on an original server hello message from the server, that an algorithm selected by the server is the second algorithm; and the client device determines, based on a target server hello message from the protection device, that an algorithm selected by the server is the second algorithm.

For example, when sending the server hello message, the server uses the server hello message to carry an identifier of the algorithm selected by the server, and sends the original server hello message including the identifier of the second algorithm. After receiving the original server hello message, the protection device determines, based on the identifier of the second algorithm in the original server hello message, that the algorithm selected by the server is the second algorithm. After performing processing such as certificate replacement on the server hello message sent by the server, the protection device generates the target server hello message, where the target server hello message still carries the identifier of the second algorithm. The protection device sends the target server hello message to the client device. After receiving the target server hello message, the client device determines, based on the identifier of the second algorithm in the target server hello message, that the algorithm selected by the server is the second algorithm.

Step S505': The client device sends the original encrypted packet.

Step S506': The protection device receives the original encrypted packet from the client device.

Step S507': The protection device decrypts the original encrypted packet by using the first session key according to the second algorithm, and inspects plaintext data obtained through decryption, and the protection device encrypts the inspected data by using the second session key according to the second algorithm, to obtain a target encrypted packet.

Step S508': The protection device sends the target encrypted packet to the server.

Step S509': The server decrypts the target encrypted packet by using the second session key according to the second algorithm, to obtain the plaintext data inspected by the protection device.

Step S510': When the server is to send data to the client device, the server encrypts the service data by using the second session key according to the second algorithm, to obtain an original encrypted packet; and the server sends the original encrypted packet.

Step S511': The protection device receives the original encrypted packet from the server.

Step S512': The protection device decrypts the original encrypted packet from the server by using the second session key according to the second algorithm, inspects plaintext data obtained through decryption, and encrypts the inspected data by using the first session key according to the second algorithm, to obtain a target encrypted packet.

Step S513': The protection device sends the target encrypted packet to the client device.

Step S514': The client device decrypts the target encrypted packet by using the first session key according to the second algorithm, to obtain the plaintext data inspected by the protection device.

According to the foregoing procedure, communication failure caused because the protection device does not support the algorithm agreed by the client and the server in the data transmission phase is avoided, and reliability and a success rate of data transmission are improved. In addition, security and compatibility are achieved simultaneously, so that the algorithm used by the protection device meets requirements of the client and server for traffic transmission security. The following describes a principle for achieving this effect.

In the SSL/TLS protocol, the client sends a client hello message to the server, so as to negotiate with the server about an encryption and decryption algorithm to be used in subsequent data transmission. Specifically, the client uses the client hello message to carry an algorithm list including a series of algorithms supported by the client, and sends the client hello message to the server. After receiving the client hello message, the server finds an algorithm supported by both sides based on the algorithm list in the client hello message and notifies the client of the agreed algorithm. Then, the client and server use the agreed algorithm to encrypt and decrypt data during data transmission.

If the algorithm agreed by the client and the server is not supported by the protection device, when receiving encrypted data transmitted between the client and the server, the protection device cannot decrypt the encrypted data to obtain plaintext data, and cannot perform security inspection on the plaintext data. As a result, the security inspection fails.

By implementing the SSL/TLS handshake procedure provided in this embodiment, all algorithms, in the algorithm list, that are left after the unsupported algorithm is deleted are supported by the protection device because the protection device deletes the unsupported algorithm from the algorithm list in the client hello message. Therefore, after the protection device forwards the client hello message obtained through algorithm deletion to the server, the algorithm list in the client hello message received by the server does not include the algorithm that is not supported by the protection device. In other words, all algorithms in the algorithm list in the client hello message received by the server are supported by the protection device. Therefore, when the server selects an algorithm from the algorithm list in the client hello message, the algorithm selected by the server (that is, the algorithm agreed in the SSL/TLS handshake phase) is supported by the protection device.

In this case, because the algorithm agreed in the handshake phase is supported by the protection device, it is ensured that the client, the protection device, and the server use an algorithm supported by all the three parties to encrypt and decrypt data in the data transmission phase, thereby avoiding security inspection failure caused because the protection device does not support an algorithm required for decryption.

According to the conventional SSL man-in-the-middle proxy solution shown in FIG. 3A to FIG. 3C, security and compatibility cannot be achieved simultaneously. This is because the algorithm list sent by the protection device to the server is independently generated by the protection device and is irrelevant to the algorithm list provided by the client. Specifically, a maintenance technician preconfigures an algorithm list on the protection device. When the protection device performs handshake with the server, an algorithm preconfigured on the protection device is on the algorithm list sent to the server. In other words, regardless of algorithms included in an algorithm list previously sent by the client, the algorithm list sent by the protection device to the server is fixed (which depends on pre-configuration).

Two types of algorithms can be configured, which are high-security algorithms and algorithms with good compatibility but security risks. When a high-security algorithm is configured on the protection device and the client or server does not support the high-security algorithm, compatibility problems may occur, resulting in negotiation failure. Configuring an algorithm with good compatibility on the protection device results in low security when the client or server has a high requirement on algorithm security.

In this embodiment, this dilemma is resolved by implementing the foregoing process of algorithm list exchange, and security and compatibility is balanced. To be specific, the client generates the algorithm list, and the protection device modifies the algorithm list. If the client uses the high-security algorithm, the client sends a list containing high-security algorithms to the protection device. After deleting an unsupported algorithm, the protection device sends the algorithm list from the client to the server. After the server selects an algorithm from high-security algorithms left after the deletion, the high-security algorithm selected by the server is used for third-party encryption and decryption, so that the security requirement can be met. If the client uses the algorithm with good compatibility, the client sends a list containing algorithms with good compatibility to the protection device. After deleting an unsupported algorithm, the protection device sends the algorithm list from the client to the server. After the server selects an algorithm from algorithms with good compatibility left after the deletion, the algorithm with good compatibility selected by the server is used for third-party encryption and decryption, so that the security requirement can be met. To sum up, besides fixed configuration, the algorithm used when the protection device interacts with the two sides is determined based on the security requirement of the client and the selection of the server. In this way, Both security and compatibility are ensured based on adaptive selection. Flexibility is high while both security and compatibility are ensured.

In some embodiments, the protection device further replaces a certificate of the server to ensure that a man-in-the-middle signature can be verified by the client device, to avoid transmission failure of data (such as a man-in-the-middle DH parameter) transmitted to the client device together with the man-in-the-middle signature due to signature verification failure.

Figure 9:
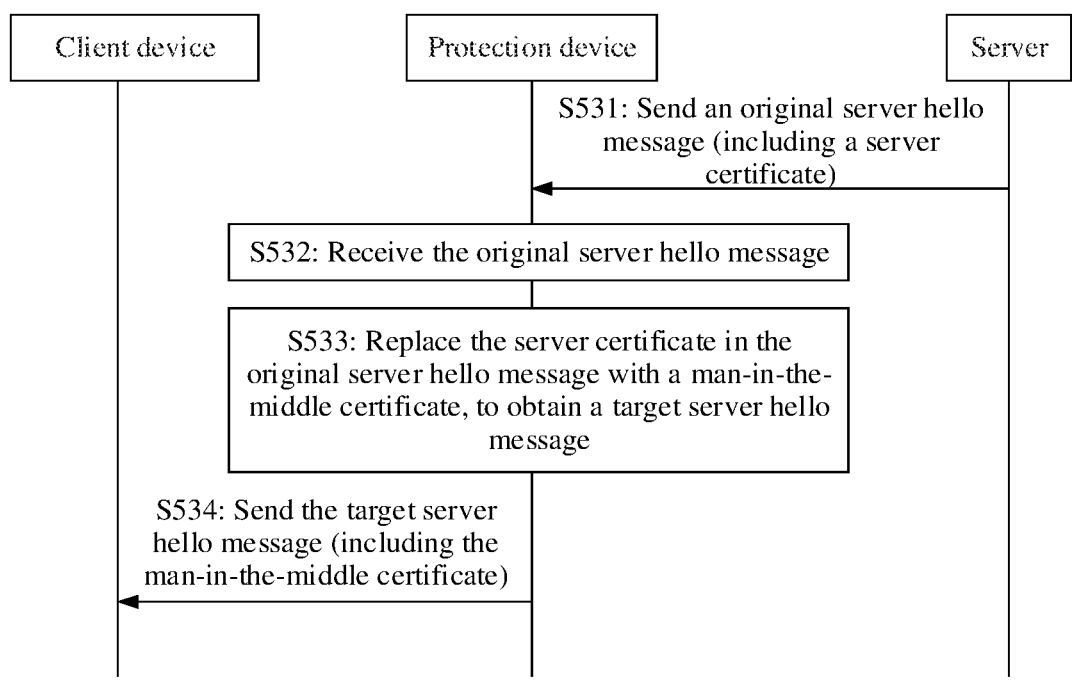
FIG. 9 is a flowchart of a hello message interaction between three parties in communication according to an embodiment of this application.

For example, refer to FIG. 9. A procedure of certificate replacement includes the following step S531 to step S534.

Step S531: The server generates and sends an original server hello message.

The original server hello message includes a server certificate. The server certificate includes a public key of the server.

Step S532: The protection device receives the original server hello message from the server.

Step S533: The protection device replaces the server certificate in the original server hello message with a man-in-the-middle certificate, to obtain a target server hello message.

The target server hello message includes the man-in-the-middle certificate. The man-in-the-middle certificate includes a public key of the protection device.

Step S534: The protection device sends the target server hello message to the client device.

The client device receives the target server hello message. The client device obtains the public key of the protection device from the man-in-the-middle certificate in the target server hello message, and stores the public key of the protection device as a public key of a peer in an SSL/TLS session. Then, when the client device interacts with the protection device, the protection device generates a man-in-the-middle signature by using a private key of the protection device, and the client device verifies the man-in-the-middle signature by using the public key of the protection device.

Figure 7:
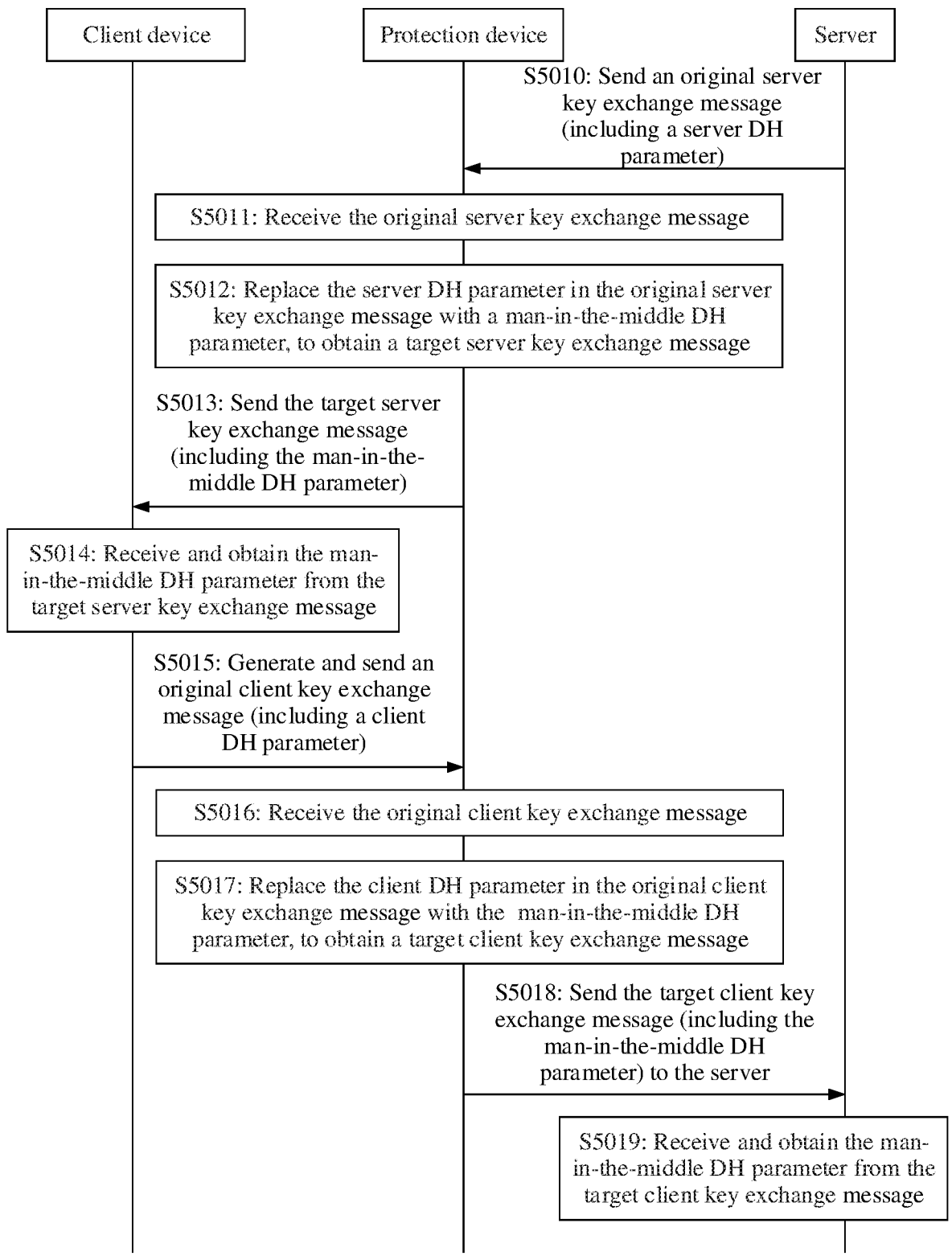
FIG. 7 is a flowchart of a key exchange message interaction between three parties in communication according to an embodiment of this application.

For example, in the procedure shown in FIG. 7, a target server key exchange message sent by the protection device in step S5013 includes the man-in-the-middle signature and a man-in-the-middle DH parameter. When the client device receives the target server key exchange message, the client device verifies the man-in-the-middle signature by using the public key of the protection device. Because the public key of the protection device and the private key used for generating the man-in-the-middle signature are a pair of keys that used for encryption and decryption, the man-in-the-middle signature can be verified by the client device, and the client device stores the man-in-the-middle DH parameter and sends an original client key exchange message.

In some embodiments, the protection device extracts and forwards a random number in the original hello message, so as to reuse random numbers generated by the client device and the server. In this way, overheads caused by random number generation performed by the protection device are avoided.

Specifically, refer to FIG. 3A to FIG. 3C. In the method shown in FIG. 3A to FIG. 3C, the protection device is required to generate two man-in-the-middle random numbers to obtain a session key between the protection device and the client and a session key between the protection device and the server. To be specific, when the protection device interacts with the server, the protection device needs to generate the man-in-the-middle random number 1, and the protection device sends the man-in-the-middle random number 1 to the server. Subsequently, both the protection device and the server generate the session key 2 by using the man-in-the-middle random number 1 and the server random number. When the protection device interacts with the client device, the protection device needs to generate the man-in-the-middle random number 2, and the protection device sends the man-in-the-middle random number 2 to the client device. Subsequently, both the protection device and the client device generate a session key 1 by using the man-in-the-middle random number 2 and the client random number. It is clear that generating the man-in-the-middle random number 1 and the man-in-the-middle random number 2 lead to some resource overheads, and consumes computing power of the protection device.

However, in some embodiments of this application, after the protection device receives the original client hello message sent by the client device, the protection device further extracts the client random number from the original client hello message. The target client hello message sent by the protection device to the server includes the client random number, so as to transmit the client random number generated by the client device to the server. Subsequently, both the protection device and the server generate the second session key by using the client random number and the server random number, so as to reuse the client random number generated by the client device, thereby avoiding resource overheads caused by generation of the man-in-the-middle random number 1. After the protection device receives the original server hello message sent by the server, the protection device further extracts the server random number from the original server hello message. The target server hello message sent by the protection device to the client device includes the server random number, and the server random number generated by the server is transmitted to the client device. Subsequently, both the protection device and the client device generate the first session key by using the client random number and the server random number, so as to reuse the server random number generated by the server, thereby avoiding resource overheads caused by generation of the man-in-the-middle random number 2.

It can be learned from the foregoing DH parameter replacement, signature replacement, certificate replacement, and random number extraction that, in the SSL man-in-the-middle solution provided in this embodiment, for session key agreement between two sides, an OpenSSL library is not used for complete black-box handshake processing; an original handshake message is used as a trigger; and key agreement information (such as a DH parameter, a random number, a signature, and a certificate) is extracted from the original handshake message and are modified. Because a complex OpenSSL processing procedure is not implemented, a technical problem that using OpenSSL may lead to entry into the kernel mode can be avoided. Implementation complexity of the solution is reduced, and resource usage of the protection device is reduced. In addition, a library for complete SSL interaction is not required, to avoid problems concerning security and compatibility of a self-developed SSL library. After a key is obtained, in a subsequent symmetric processing phase, optionally, an OpenSSL session processing procedure is not used, but the protection device performs parsing at an SSL record layer. This facilitates implementation of subsequent symmetric encryption processing by using hardware (implementing symmetric encryption processing by using logic, an ASIC, or the like), which is described in detail below.

In some embodiments, steps for DH operation, encryption, and decryption are hardware accelerated. Specifically, the protection device includes one or more hardware accelerators. The hardware accelerator is, for example, the encryption/decryption accelerator 333 in FIG. 4.

The hardware accelerator is dedicated hardware for executing a DH algorithm or an encryption/decryption algorithm. The hardware accelerator is configured to accelerate a step in which a DH algorithm or an encryption/decryption algorithm is needed, so as to improve performance of the protection device in terms of key agreement, data encryption, or data decryption based on the DH algorithm.

For example, the hardware accelerator includes but is not limited to a field-programmable gate array (FPGA), an application-specific integrated circuit (ASIC), a system on chip (SoC), a central processing unit (CPU), a network processor (NP), a digital signal processor (DSP), a micro controller (MCU), a programmable controller (programmable logic device, PLD), or another integrated chip.

With reference to the method shown in FIG. 6A and FIG. 6B, for example, the hardware accelerator is configured to generate a session key, decrypt an original encrypted packet, or encrypt inspected data.

For example, if the hardware accelerator is configured to generate the session key, step S502 is implemented in the following manner: The protection device inputs the man-in-the-middle DH parameter and the client DH parameter into the hardware accelerator, and receives a first session key generated by the hardware accelerator. Step S503 is implemented in the following manner: The protection device inputs the man-in-the-middle DH parameter and the server DH parameter into the hardware accelerator, and receives a second session key generated by the hardware accelerator.

For example, if the hardware accelerator is configured to decrypt the original encrypted packet, step S507 is implemented in the following manner: The protection device inputs the first session key and the original encrypted packet into the hardware accelerator, and receives the plaintext data obtained through decryption performed by the hardware accelerator. Step S512 is implemented in the following manner: The protection device inputs the second session key and the original encrypted packet into the hardware accelerator, and receives the plaintext data obtained through decryption performed by the hardware accelerator.

For example, if the hardware accelerator is configured to encrypt the inspected data, step S507 is implemented in the following manner: The protection device inputs the second session key and the inspected data into the hardware accelerator, and receives the target encrypted packet obtained through encryption performed by the hardware accelerator. Step S512 is implemented in the following manner: The protection device inputs the first session key and the inspected data into the hardware accelerator, and receives the target encrypted packet obtained through encryption performed by the hardware accelerator.

The protection device implements the steps in the method procedure shown in FIG. 6A and FIG. 6B through hardware acceleration, to offload tasks consuming a large amount of computing power in the SSL proxy, such as DH operation and encryption, from a CPU to the hardware accelerator. In other words, steps including algorithms that consume most performance are processed by dedicated acceleration hardware, to reduce CPU computing power used by the SSL proxy. This greatly improves resource usage and performance, and accelerates processing of the SSL proxy on the protection device.

By using an example, the following describes a complete process of the SSL man-in-the-middle proxy solution.

In the following example, the foregoing first session key is a session key 1, the foregoing second session key is a session key 2, the foregoing first premaster key is a premaster key 1, the foregoing second premaster key is a premaster key 2, and the man-in-the-middle DH parameter sent by the protection device to the client device and server is Pubkey_fw. The client DH parameter replaced by the protection device is Pubkey_C. The server DH parameter replaced by the protection device is Pubkey_S. In "Pubkey_fw", "fw" indicates "firewall". "S" in "Pubkey_S" represents "server". "C" in "Pubkey_C" represents "client".

Figure 10A:
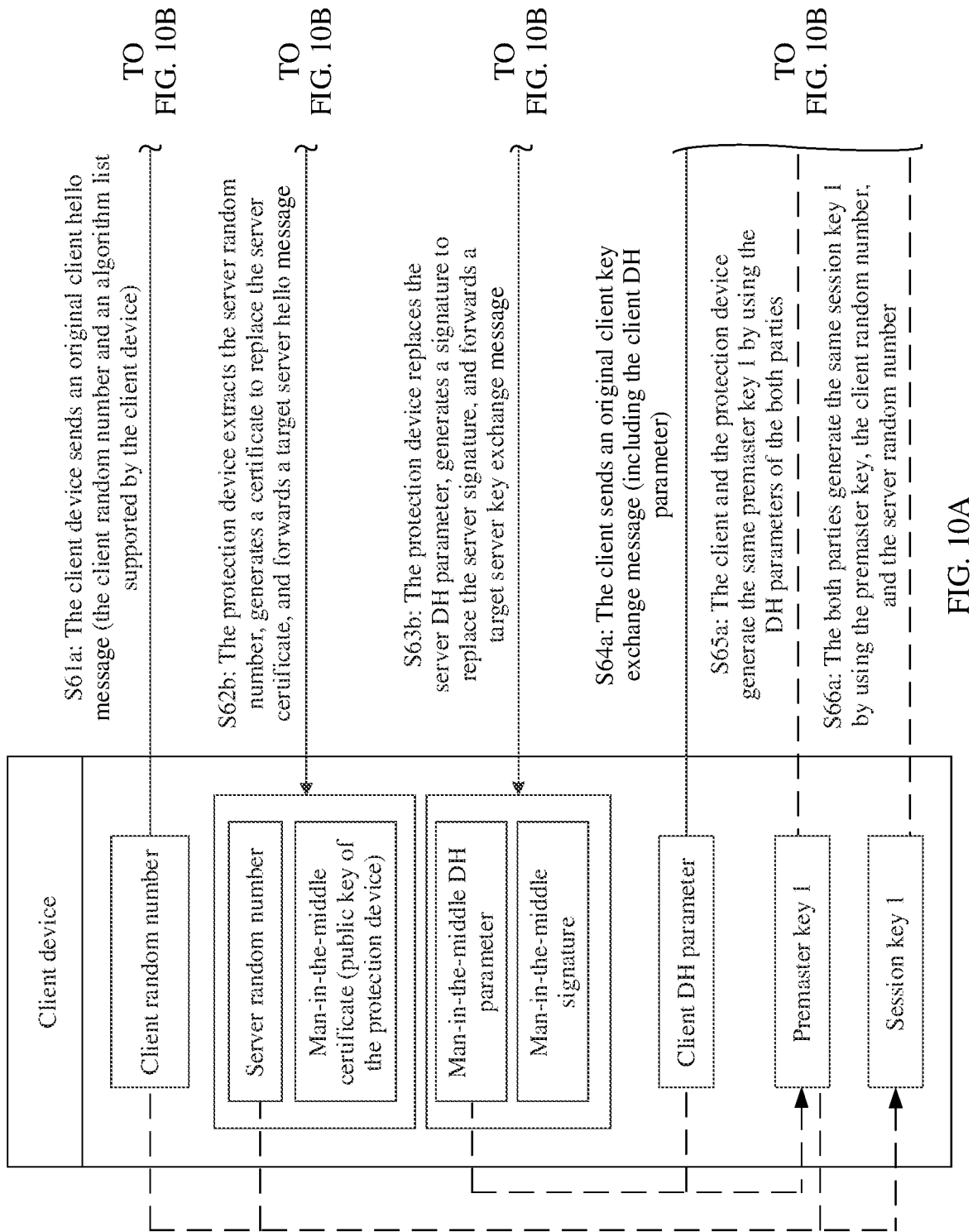
FIG. 10A to FIG. 10C are a flowchart of an inspection solution based on an SSL/TLS man-in-the-middle proxy according to an embodiment of this application.
Figure 10B:
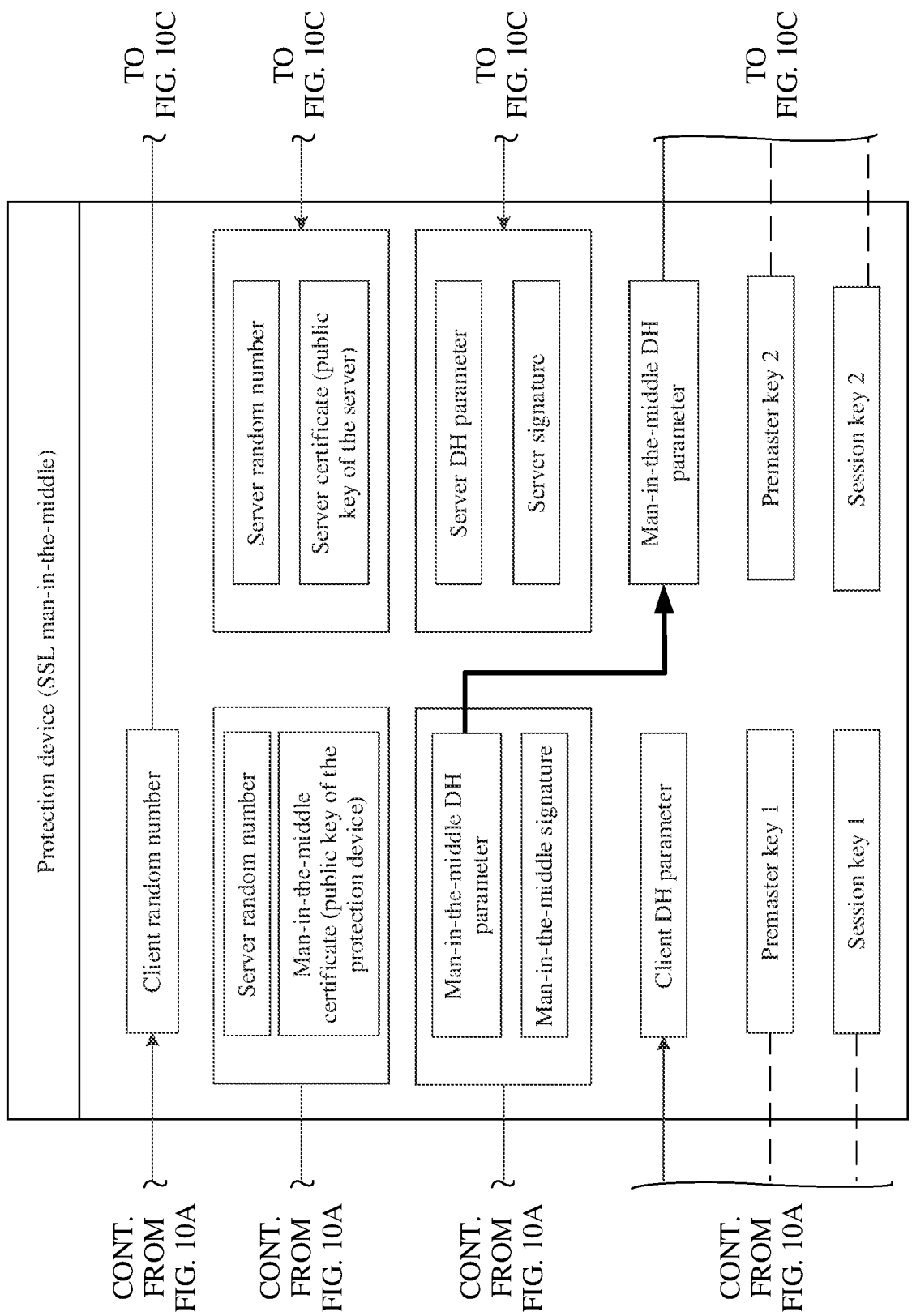
Figure 10C:
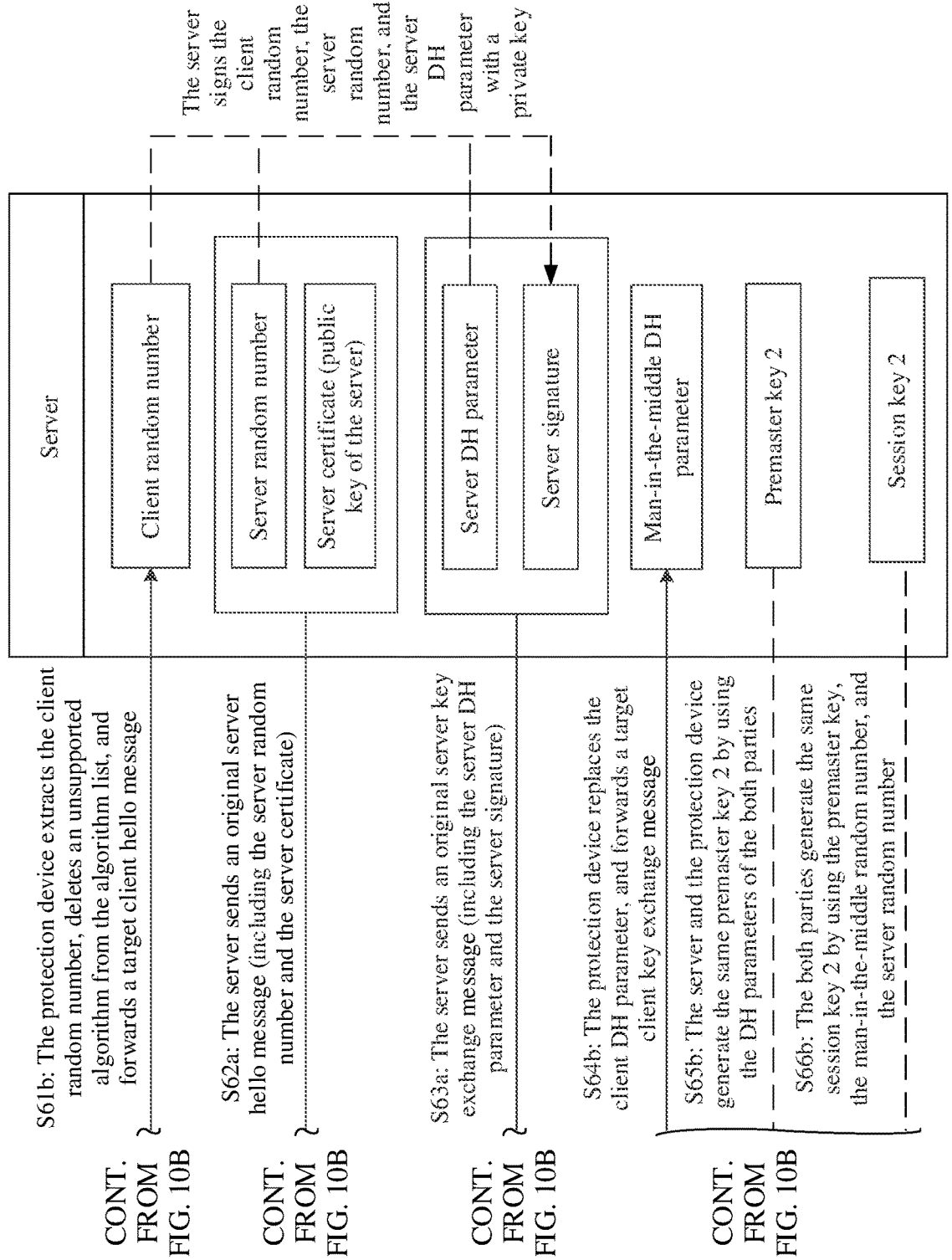

As shown in FIG. 10A to FIG. 10C, the following example includes the following step S61a to step S66b in the handshake phase.

Step S61a: The client device sends an original client hello message. The original client hello message includes a client random number and a list of algorithms supported by the client device.

Step S61b: After receiving the original client hello message, the protection device parses the original client hello message, and the protection device extracts the client random number from the original client hello message. The protection device checks whether the algorithm list of the original client hello message contains an algorithm that is not supported by the protection device. If the algorithm list of the original client hello message includes an algorithm that is not supported by the protection device, the protection device deletes the algorithm that is not supported by the protection device from the original client hello message, to obtain a target client hello message. Then, the protection device forwards the target client hello message to the server.

Step S62a: After receiving the target client hello message, the server selects, from information provided by the client device in the target client hello message, a version and an algorithm that are supported by the server. The server generates an original server hello message based on the selected algorithm, a random number generated by the server (server random number), and a server certificate. The server sends the original server hello message to the client device. The original server hello message includes an identifier of the algorithm selected by the server, the server random number, and the server certificate. The server certificate includes a public key of the server.

Step S62b: The protection device receives the original server hello message from the server. The protection device extracts the server random number and the identifier of the algorithm from the original server hello message. The protection device generates a certificate (man-in-the-middle certificate) re-issued by the protection device, and replaces the server certificate in the original server hello message with the man-in-the-middle certificate. The man-in-the-middle certificate includes a public key of the protection device. The protection device sends a target server hello message to the client device. The target server hello message includes the identifier of the algorithm selected by the server.

Step S63a: If the server selects, based on the selection performed based on the target client hello message, to use a DH negotiation algorithm to negotiate a session key in step S62a, the server generates a DH parameter of the server (the server DH parameter) in step S63a. The server signs the client random number, the server random number, and the server DH parameter with a private key of the server, to obtain a server signature. The server uses an original server key exchange message to carry a public part (Pubkey_S) of the DH parameter and the server signature, and sends the original server key exchange message to the client device.

For example, the server selects the elliptic curve algorithm secp256r1 to negotiate the session key. The original server key exchange message sent by the server includes content shown in Table 3. Content (043c334e8058c5fb31fa8fa517a44d59e9dbeb3705 a0612 . . . ) of the Pubkey field in Table 3 is the server DH parameter. Content (483fa3177932cf6512ba616444e84d7d 98349e60fc29e959) of the Signature field in Table 3 is the server signature.

TABLE 3

| Field | Field content |
| --- | --- |
| Handshake Protocol | Server Key Exchange |
| Handshake Type | Server Key Exchange (12) |
| Length | 329 |
| | EC Diffie-Hellman Server Params |
| Curve Type: | named curve (0x03) |
| Named Curve | secp256r1 (0x0017) |
| Pubkey Length | 65 |
| Pubkey | 043c334e8058c5fb31fa8fa517a44d59e9dbeb3705a0612 . . . |
| Signature Algorithm | rsa_pkcs1sha512 (0x0601) |
| Signature Length: | 256 |
| Signature | 483fa3177932cf6512ba616444e84d7d98349e60fc29e959 . . . |

In Table 3, " . . . " in "043c334e8058 c5fb31fa8fa517a44d59e9dbeb3705a0612 . . . " of the Pubkey field is an ellipsis, and " . . . " indicates that the Pubkey field further includes but omits content that is not shown. In other words, the DH parameter further includes a part that is not shown. Meaning of an ellipsis in content of a Pubkey field in another table shown subsequently in this specification is similar to that of the ellipsis herein.

In Table 3, " . . . " in "483fa3177932 cf6512ba616444e84d7d98349e60fc29e959 . . . " of the Signature field is an ellipsis, and " . . . " indicates that the Signature field further includes but omits content that is not shown. In other words, the signature further also includes a part that is not shown. Meaning of an ellipsis in content of a Signature field in another table shown subsequently in this specification is similar to that of the ellipsis herein.

Meaning of content of fields other than the Pubkey field and the Signature field in Table 3 is as follows:

The content of the Handshake Protocol field is Server Key Exchange. Content of the Handshake Type field (that is, a type of a handshake message in an SSL/TLS protocol) is Server Key Exchange, and the handshake type is represented by a value 12. Content of the Length field is 329. An ECDH server parameter field includes a Curve Type field, a Named Curve field, a Pubkey Length field, and a Pubkey field. Content of the Curve Type field is named curve, and the curve type is represented by a value 0x03. Content of the Named Curve field is secp256r1, and the named curve is represented by a value 0x0017. The content of the Curve Type field and the Named Curve field indicate that an algorithm for generating the Pubkey is secp256r1. Content of the Pubkey Length field is 65. The content of the Signature Algorithm (an algorithm used to generate the server signature) field is rsa_pkcs1sha512, which is represented by the value 0x0601. Content of the Signature Length (length of the server signature) field is 256.

Step S63b: After receiving the original server key exchange message sent by the server, the protection device extracts the Pubkey_S (server DH parameter)

from the original server key exchange message. Then, the protection device replaces the Pubkey_S (server DH parameter) in the original server key exchange message with a Pubkey_fw (man-in-the-middle DH parameter) generated by the protection device using the same algorithm. In addition, the protection device signs the client random number, the server random number, and the man-in-the-middle DH parameter by using the private key of the protection device, to regenerate a man-in-the-middle signature. The protection device replaces the server signature in the original server key exchange message with a man-in-the-middle signature. The protection device sends the target server key exchange message to the client device.

For example, the original server key exchange message received by the protection device includes the content shown in Table 3. The protection device replaces the content of the Pubkey field in Table 3 with the man-in-the-middle DH parameter, and the protection device replaces the content of the Signature field in Table 3 with the man-in-the-middle signature. As a result, a target server key exchange message including the content shown in the following Table 4 is obtained and is sent to the client device. Content (04083f0c2b627d51d88fff2d2d9fa373328d . . . ) of the Pubkey field in Table 4 is the man-in-the-middle DH parameter. Content (046f476af7cd0e95f912246656d2bc7b1ccc b7f490133e90 . . . ) of the Signature field in Table 4 is the server signature.

generated by the protection device based on complex processing logic such as a session status. In an example, after receiving the original server key exchange message that is sent by the server and that includes the content shown in Table 3, the protection device modifies the content of the Pubkey field and the content of the Signature field in Table 3, to obtain the target server key exchange message that includes the content shown in Table 4. The target server key exchange message including the content shown in Table 4 is sent to the client, to implement handshake between the protection device and the client. In this implementation, processing logic of the protection device is simplified, and overheads of the protection device are reduced.

Step S64a: After the client device receives the target server key exchange message sent by the protection device, the client device generates and sends an original client key exchange message. The original client key exchange message includes a client DH parameter. The client DH parameter is specifically a public part Pubkey_C of the DH parameter.

For example, the original client key exchange message sent by the client device includes content shown in the following Table 5. Content (0456be94b776d9a 32dc00d4f673bb3f9c232b2526575066 . . . ) of a Pubkey field in Table 5 is the client DH parameter.

TABLE 4

| Field | Field content |
| --- | --- |
| Handshake Protocol | Server Key Exchange |
| Handshake Type | Server Key Exchange (12) |
| Length | 329 |
| | EC Diffie-Hellman Server Params |
| Curve Type: | named curve (0x03) |
| Named Curve | secp256r1 (0x0017) |
| Pubkey Length | 65 |
| Pubkey | 04083f0c2b627d51d88fff2d2d9fa373328d . . . |
| Signature Algorithm | rsa_pkcs1sha512 (0x0601) |
| Signature Length: | 256 |
| Signature | 046f476af7cd0e95f912246656d2bc7b1cccb7f490133e90 . . . |

Meaning of content of fields other than the Pubkey field and the Signature field in Table 4 is the same as that in Table 3. For details, refer to the Table 3.

It can be learned from comparison between Table 3 and Table 4 that the content of the Pubkey field and the Signature field in Table 4 is different from that in Table 3. The content of the two fields in Table 4 is generated by the protection device. Content of fields other than the two fields in Table 3 can be directly reused in Table 4, and does not need to be

TABLE 5

| Field | Field content |
| --- | --- |
| Handshake Protocol | Client Key Exchange |
| Handshake Type | Client Key Exchange (16) |
| Length | 66 |
| | EC Diffie-Hellman Client Params |
| Pubkey Length | 65 |
| Pubkey | 0456be94b776d9a32dc00d4f673bb3f9c232b2526575066 . . . |

Meaning of content of fields other than the Pubkey field in Table 5 is as follows:

Content of the Handshake Protocol field is Client Key Exchange. The content of the Handshake Type field is Client Key Exchange. The handshake type is represented by a value 16. Content of the Length field is 66. The ECDH client parameter field includes the Pubkey Length field and the Pubkey field. Content of the Pubkey Length field is 65.

Step S64b: The protection device receives the original client key exchange message from the client device. After the protection device extracts the client DH parameter Pubkey_C from the original client key exchange message, the protection device replaces the client DH parameter Pubkey_C in the original client key exchange message with the DH parameter Pubkey_fw (man-in-the-middle DH parameter) of the protection device. The protection device sends a target client key exchange message to the server.

For example, the original client key exchange message received by the protection device includes the content shown in Table 5. The protection device replaces the content of the Pubkey field in Table 5 with the man-in-the-middle DH parameter. As a result, a target client key exchange message including the content shown in the following Table 6 is obtained and is sent to the server. Content (04083f0c2b627d51d88fff2d2d9fa373328d . . . ) of the Pubkey field in Table 6 is the man-in-the-middle DH parameter.

TABLE 6

| Field | Field content |
| --- | --- |
| Handshake Protocol | Client Key Exchange |
| Handshake Type | Client Key Exchange (16) |
| Length | 66 |
| EC Diffie-Hellman Client Params | |
| Pubkey Length | 65 |
| Pubkey | 04083f0c2b627d51d88fff2d2dfa03733298d . . . |

Meaning of content of fields other than the Pubkey field in Table 6 is the same as that in Table 5. For details, refer to the Table 5.

It can be learned from comparison between Table 4 and Table 6 that, the content of the Pubkey field in Table 4 is the same as that in Table 6, in other words, the man-in-the-middle DH parameter sent by the protection device to the server is the same as the man-in-the-middle DH parameter sent by the protection device to the client device. DH parameter reuse is implemented, and therefore overheads of generating two DH parameters are saved.

It can be learned from comparison between Table 5 and Table 6 that the content of the Pubkey field in Table 6 is different from that in Table 5. The content of the Pubkey field in Table 6 is generated by the protection device. The content of the field other than the Pubkey field in Table 5 can be directly reused in Table 6, and does not need to be generated by the protection device based on complex processing logic such as a session status. In an example, after receiving the original client key exchange message that is sent by the client and that includes the content shown in Table 5, the protection device modifies the content of the Pubkey field in Table 5, to obtain the target client key exchange message that includes the content shown in Table 6. The target client key exchange message including the content shown in Table 6 is sent to the server, to implement handshake between the protection device and the server. In this implementation, processing logic of the protection device is simplified, and overheads of the protection device are reduced.

Step S65a: The client device performs computation by using the private part of the DH parameter of the client device and the Pubkey_fw, to obtain a premaster key 1. The protection device performs computation by using the Pubkey_C and the private part of the DH parameter of the protection device, to obtain the same premaster key 1.

Step S65b: Similar to step S65a, the server performs computation by using the private part of the server DH parameter and the Pubkey_fw, to obtain a premaster key 2. The protection device performs computation by using the Pubkey_S and the private part of the DH parameter of the protection device, to obtain the same premaster key 2.

Step S66a: The client device and the protection device respectively perform computation by using the premaster key 1, the client random number, and the server random number, to obtain a same session key 1.

Step S66b: The server and the protection device respectively perform computation by using the premaster key 2, the client random number, and the server random number, to obtain the same session key 2.

In this case, session negotiation is completed. A subsequent data transmission process in which the client device sends data to the server is shown below, including steps (1-1) to (1-4).

Step (1-1): When the client device is to send data message to the server, the client device encrypts plaintext data by using a session key 1, to obtain an encrypted packet; and the client device sends the encrypted packet.

Step (1-2): After receiving the encrypted packet sent by the client device, the protection device decrypts the packet by using the session key 1, and then the protection device checks content of the decrypted plaintext data.

Step (1-3): If determining that the plaintext data is not threatening, the protection device uses a session key 2 to encrypt the checked data and sends the encrypted data to the server.

Step (1-4): After the server receives the encrypted packet from the protection device, the server decrypts the encrypted packet by using the session key 2.

A transmission process in which the server sends data to the client device is similar to the foregoing process including steps (1-1) to (1-4), and includes the following steps (2-1) to (2-4).

Step (2-1): When the server is to send a data message to the client device, the server encrypts plaintext data by using a session key 2, to obtain an encrypted packet; and the server sends the encrypted packet.

Step (2-2): After receiving the encrypted packet sent by the server, the protection device performs decryption by using the session key 2, and then the protection device checks content of the decrypted plaintext data.

Step (2-3): If determining that the plaintext data is not threatening, the protection device uses a session key 1 to encrypt the checked data and sends the encrypted data to the client device.

Step (2-4): After the client device receives the encrypted packet from the protection device, the client device decrypts the encrypted packet by using the session key 1.

In steps (1-1) to (1-4) and steps (2-1) to (2-4), the three communication parties (the client device, the protection device, and the server) use a same algorithm for encryption and decryption. For example, an algorithm used by the server for encryption and decryption is an algorithm corresponding to an algorithm identifier in an original server hello message. An algorithm used by the protection device for encryption and decryption is an algorithm corresponding to an algorithm identifier in an original server hello message. An algorithm used by the client device for encryption and decryption is an algorithm corresponding to an algorithm identifier in a target server hello message.

Figure 11:
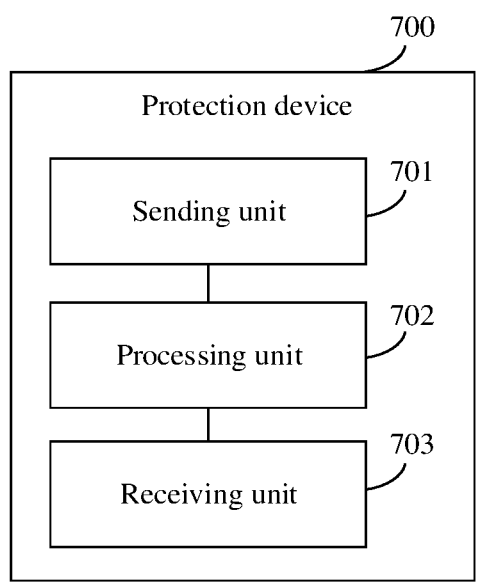
FIG. 11 is a schematic diagram of a structure of a protection device according to an embodiment of this application.

FIG. 11 is a schematic diagram of a structure of another protection device according to an embodiment of this application. Optionally, a protection device 700 having the structure shown in FIG. 11 is the protection device 33 in FIG. 4. Optionally, the protection device having the structure shown in FIG. 11 is the protection device 400 in FIG. 5. The protection device 700 includes a sending unit 701, a processing unit 702, and a receiving unit 703.

The sending unit 701 is configured to perform S501. The processing unit 702 is configured to perform S502. The receiving unit 703 is configured to perform S506 and S511. If the original encrypted packet is from the client device, the processing unit 702 is further configured to perform S507. The sending unit 701 is further configured to perform S508. If the original encrypted packet is from the server, the processing unit 702 is further configured to perform S512, and the sending unit 701 is further configured to perform S513.

In some embodiments, the receiving unit 703 is further configured to perform S5011; the processing unit 702 is further configured to perform S5012; and the sending unit 701 is further configured to perform S5013.

In some embodiments, the receiving unit 703 is further configured to perform S5016; the processing unit 702 is further configured to perform S5017; and the sending unit 701 is further configured to perform S5018.

In some embodiments, the processing unit 702 is further configured to replace the server signature in the original server key exchange message with the man-in-the-middle signature.

In some embodiments, the processing unit 702 is configured to generate the first premaster key by using the man-in-the-middle DH parameter and the client DH parameter; generate the first session key by using the first premaster key, the client random number, and the server random number; generate the second premaster key by using the man-in-the-middle DH parameter and the server DH parameter; and generate the second session key by using the second premaster key, the client random number, and the server random number.

In some embodiments, the receiving unit 703 is further configured to perform S522; the processing unit 702 is further configured to perform S523; and the sending unit 701 is further configured to perform S524.

In some embodiments, the processing unit 702 is configured to perform S507' and S512'. The sending unit 701 is configured to perform S508' and S513'.

In some embodiments, the receiving unit 703 is further configured to perform S532; the processing unit 702 is further configured to perform S533; and the sending unit 701 is further configured to perform S534.

The apparatus embodiment described in FIG. 11 is merely an example. For example, division into the units is merely logical function division and may be other division in actual implementation. For example, a plurality of units or components may be combined or integrated into another system, or some features may be ignored or not performed. Optionally, functional units in embodiments of this application may be integrated into one processing unit, or each of the units may exist alone physically, or two or more units are integrated into one unit. Optionally, the foregoing units in FIG. 11 are implemented in a form of hardware or software functional unit. For example, when implemented by using software, the receiving unit 703, the processing unit 702, and the sending unit 701 are optionally implemented by software functional modules generated after the CPU in FIG. 5 reads the program code 410 stored in the memory 403. Optionally, the foregoing units in FIG. 11 are implemented by different pieces of hardware in the protection device. For example, the receiving unit 703 and the sending unit 701 are implemented by the network interface 404 in FIG. 5, and the processing unit is implemented by the processor 401 in FIG. 5, a field-programmable gate array (FPGA), or a programmable device such as a coprocessor. Optionally, the foregoing functional modules may be implemented by combining software and hardware. For example, the receiving unit 703 and the sending unit 701 are implemented by a hardware programmable device, and the processing unit 702 is a software functional module generated after a CPU reads the program code 410 stored in the memory 403.

A person of ordinary skill in the art should be aware that steps of the methods and units described with reference to embodiments disclosed in this specification can be implemented by electronic hardware, computer software, or a combination of computer software and electronic hardware. To clearly illustrate interchangeability of hardware and software, steps and components of the embodiments are generally described above based on functions. Whether the functions are performed by hardware or software depends on particular applications and design constraints of the technical solutions. An ordinary person skilled in the art may use different methods to implement the described functions for each particular application, but it should not be considered that the implementation goes beyond the scope of this application.

It may be clearly understood by a person skilled in the art that, for purpose of convenient and brief description, for detailed working processes of the foregoing system, apparatuses, and units, refer to corresponding processes in the foregoing method embodiments. Details are not described herein again.

In this application, terms such as "first" and "second" are used to distinguish between same items or similar items having basically same functions. It should be understood that there is no logical or time sequence dependency between "first" and "second", and a quantity and an execution sequence are not limited. For example, without departing from the scope of various examples, the first session key may be referred to as a second session key, and similarly, the second session key may be referred to as a first session key. Both the first session key and the second session key may be session keys, and in some cases, may be separate and different session keys.

The term "at least one" in this application means one or more.

All or some of the foregoing embodiments may be implemented by using software, hardware, firmware, or any combination thereof. When software is used to implement the embodiments, all or some of the embodiments may be implemented in a form of a computer program product. The computer program product includes one or more computer program instructions. When the computer program instructions are loaded and executed on a computer, the procedures or functions according to embodiments of this application are all or partially generated. The computer may be a general-purpose computer, a dedicated computer, a computer network, or another programmable apparatus.

The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, a solid-state drive). The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that modifications may still be made to the technical solutions described in the foregoing embodiments or equivalent replacements may be made to some technical features thereof, without departing from the scope of the technical solutions of embodiments of this application.

What is claimed is:

1. An encrypted packet inspection method, wherein the method comprises:
   separately sending, by a protection device, a man-in-the-middle Diffie-Hellman (DH) parameter to a client device and to a server, wherein the protection device is deployed between the client device and the server, and the man-in-the-middle DH parameter is a DH parameter generated by the protection device;
   generating, by the protection device, a first session key based on the man-in-the-middle DH parameter and a client DH parameter, wherein the client DH parameter is a DH parameter generated by the client device;
   generating, by the protection device, a second session key based on the man-in-the-middle DH parameter and a server DH parameter, wherein the server DH parameter is a DH parameter generated by the server;
   receiving, by the protection device, an original encrypted packet; and
   when the original encrypted packet originates from the client device, decrypting, by the protection device, the original encrypted packet with the first session key, inspecting plaintext data obtained through decryption, encrypting the inspected plaintext data with the second session key to obtain a target encrypted packet, and sending the target encrypted packet to the server; or
   when the original encrypted packet originates from the server, decrypting, by the protection device, the original encrypted packet with the second session key, inspecting plaintext data obtained through decryption, encrypting the inspected plaintext data with the first session key to obtain a target encrypted packet, and sending the target encrypted packet to the client device.

2. The method according to claim 1, wherein separately sending, by the protection device, the man-in-the-middle DH parameter to the client device and the server comprises:
   receiving, by the protection device, an original client key exchange message from the client device;
   replacing, by the protection device, the client DH parameter in the original client key exchange message with the man-in-the-middle DH parameter to obtain a target client key exchange message;
   and sending, by the protection device, the target client key exchange message to the server; and
   receiving, by the protection device, an original server key exchange message from the server;
   replacing, by the protection device, the server DH parameter in the original server key exchange message with the man-in-the-middle DH parameter to obtain a target server key exchange message; and
   sending, by the protection device, the target server key exchange message to the client device.

3. The method according to claim 2, wherein the method further comprises, before the protection device obtains the target server key exchange message:
   replacing, by the protection device, a server signature in the original server key exchange message with a man-in-the-middle signature, wherein the man-in-the-middle signature is obtained by signing the man-in-the-middle DH parameter with a private key of the protection device.

4. The method according to claim 1, wherein:
   the generating, by the protection device, the first session key based on the man-in-the-middle DH parameter and the client DH parameter comprises:
      generating, by the protection device, a first premaster key by using the man-in-the-middle DH parameter and the client DH parameter, and
      generating, by the protection device, the first session key by using the first premaster key, a client random number, and a server random number, wherein the client random number is a random number generated by the client device, and the server random number is a random number generated by the server; and
   generating, by the protection device, the second session key using the man-in-the-middle DH parameter and the server DH parameter comprises:
      generating, by the protection device, a second premaster key by using the man-in-the-middle DH parameter and the server DH parameter, and
      generating, by the protection device, the second session key by using the second premaster key, the client random number, and the server random number.

5. The method according to claim 4, wherein
   the client random number is extracted by the protection device from an original client hello message, and
   the server random number is extracted by the protection device from an original server hello message.

6. The method according to claim 1, further comprising, before separately sending, by the protection device, the man-in-the-middle DH parameter to the client device and the server:
   receiving, by the protection device, an original client hello message from the client device, wherein the original client hello message comprises an algorithm list;
   deleting, by the protection device, an identifier of a first algorithm in the algorithm list from the original client hello message, to obtain a target client hello message, wherein the first algorithm is an algorithm that is not supported by the protection device; and sending, by the protection device, the target client hello message to the server.

7. The method according to claim 6, wherein:
decrypting, by the protection device, the original encrypted packet with the first session key comprises decrypting, by the protection device, the original encrypted packet with the first session key according to a second algorithm, wherein the second algorithm is an algorithm corresponding to an algorithm identifier left after the identifier of the first algorithm is deleted from the algorithm list;
encrypting the inspected plaintext data with the second session key to obtain the target encrypted packet comprises encrypting the inspected plaintext data with the second session key according to the second algorithm, to obtain the target encrypted packet;
decrypting, by the protection device, the original encrypted packet with the second session key comprises decrypting, by the protection device, the original encrypted packet with the second session key according to the second algorithm; and
encrypting the inspected plaintext data with the first session key to obtain the target encrypted packet comprises encrypting the inspected plaintext data with the first session key according to the second algorithm, to obtain the target encrypted packet.

8. The method according to claim 1, further comprising, before separately sending, by the protection device, a man-in-the-middle DH parameter to the client device and the server:
receiving, by the protection device, an original server hello message from the server;
replacing, by the protection device, a server certificate in the original server hello message with a man-in-the-middle certificate to obtain a target server hello message, wherein the server certificate comprises a public key of the server, and the man-in-the-middle certificate comprises a public key of the protection device; and
sending, by the protection device, the target server hello message to the client device.

9. The method according to claim 1, wherein:
the protection device comprises a hardware accelerator configured to: generate the man-in-the-middle DH parameter, generate a session key, decrypt the original encrypted packet, or encrypt inspected data; and
when the hardware accelerator is configured to generate the session key,
generating, by the protection device, the first session key based on the man-in-the-middle DH parameter and the client DH parameter comprises: inputting, by the protection device, the man-in-the-middle DH parameter and the client DH parameter into the hardware accelerator, and receiving the first session key generated by the hardware accelerator, and
generating, by the protection device, the second session key based on the man-in-the-middle DH parameter and the server DH parameter comprises: inputting, by the protection device, the man-in-the-middle DH parameter and the server DH parameter into the hardware accelerator, and receiving the second session key generated by the hardware accelerator;
when the hardware accelerator is configured to decrypt the original encrypted packet,
decrypting, by the protection device, the original encrypted packet with the first session key comprises: inputting, by the protection device, the first session key and the original encrypted packet into the hardware accelerator, and receiving the plaintext data by the hardware accelerator, and
decrypting, by the protection device, the original encrypted packet with the second session key comprises: inputting, by the protection device, the second session key and the original encrypted packet into the hardware accelerator, and receiving the plaintext data obtained by the hardware accelerator; or
when the hardware accelerator is configured to encrypt the inspected plaintext data,
encrypting the inspected plaintext data with the second session key comprises: inputting, by the protection device, the second session key and the inspected plaintext data into the hardware accelerator, and receiving the target encrypted packet by the hardware accelerator; and
encrypting the inspected plaintext data with the first session key comprises: inputting, by the protection device, the first session key and the inspected plaintext data into the hardware accelerator, and receiving the target encrypted packet by the hardware accelerator.

10. A protection device, comprising:
a network interface, and
a processor; and
a memory operatively coupled to the processor with instructions stored therein, wherein the instructions, when executed by the processor, cause the processor to:
instruct the network interface to separately send a man-in-the-middle Diffie-Hellman (DH) parameter to a client device and a server, wherein the protection device is configured to be deployed between the client device and the server, and the man-in-the-middle DH parameter is a DH parameter generated by the protection device;
generate a first session key based on the man-in-the-middle DH parameter and a client DH parameter, wherein the client DH parameter is a DH parameter generated by the client device;
generate a second session key based on the man-in-the-middle DH parameter and a server DH parameter, wherein the server DH parameter is a DH parameter generated by the server; and
the network interface is configured to receive an original encrypted packet, wherein
when the original encrypted packet originates from the client device, the instructions when executed by the processor further cause the processor to decrypt the original encrypted packet with the first session key, inspect plaintext data obtained through the decryption, encrypt the inspected plaintext data with the second session key to obtain a target encrypted packet, and instruct the network interface to send the target encrypted packet to the server, or
when the original encrypted packet originates from the server, the instructions when executed by the processor further cause the processor to decrypt the original encrypted packet with the second session key, inspect plaintext data obtained through decryption, encrypt the inspected plaintext data with the first session key to obtain a target encrypted packet, and instruct the network interface to send the target encrypted packet to the client device.

11. The protection device according to claim 10, wherein:
the network interface is configured to:
receive an original client key exchange message from the client device, and receive an original server key exchange message from the server; and the instructions, when executed by the processor, further cause the processor to:
replace the client DH parameter in the original client key exchange message with the man-in-the-middle DH parameter to obtain a target client key exchange message,
instruct the network interface to send the target client key exchange message to the server,
replace the server DH parameter in the original server key exchange message with the man-in-the-middle DH parameter to obtain a target server key exchange message,
instruct the network interface to send the target server key exchange message to the client device.

12. The protection device according to claim 11, wherein the instructions, when executed by the processor, further cause the processor to replace a server signature in the original server key exchange message with a man-in-the-middle signature, wherein the man-in-the-middle signature is obtained by signing the man-in-the-middle DH parameter with a private key of the protection device.

13. The protection device according to claim 10, wherein the instructions, when executed by the processor, further cause the processor to:
generate a first premaster key by using the man-in-the-middle DH parameter and the client DH parameter;
generate the first session key by using the first premaster key, a client random number, and a server random number, wherein the client random number is a random number generated by the client device, and the server random number is a random number generated by the server;
generate a second premaster key by using the man-in-the-middle DH parameter and the server DH parameter; and
generate the second session key by using the second premaster key, the client random number, and the server random number.

14. The protection device according to claim 13, wherein the instructions, when executed by the processor, further cause the processor to:
extract the client random number from an original client hello message received by the network interface; and
extract the server random number from an original server hello message received by the network interface.

15. The protection device according to claim 10, wherein:
the network interface is configured to receive an original client hello message from the client device, wherein the original client hello message comprises an algorithm list; and
the instructions, when executed by the processor, further cause the processor to:
delete an identifier of a first algorithm in the algorithm list from the original client hello message to obtain a target client hello message, and
instruct the network interface to send the target client hello message to the server, wherein the first algorithm is an algorithm that is not supported by the processor.

16. The protection device according to claim 15, wherein the instructions, when executed by the processor, further cause the processor to:
decrypt the original encrypted packet with the first session key according to a second algorithm, wherein the second algorithm is an algorithm corresponding to an algorithm identifier left after the identifier of the first algorithm is deleted from the algorithm list;
encrypt the inspected plaintext data with the second session key according to the second algorithm to obtain the target encrypted packet;
decrypt the original encrypted packet with the second session key according to the second algorithm; and
encrypt the inspected plaintext data with the first session key according to the second algorithm to obtain the target encrypted packet.

17. The protection device according to claim 10, wherein:
the network interface is further configured to receive an original server hello message from the server; and
the instructions, when executed by the processor, further cause the processor to:
replace a server certificate in the original server hello message with a man-in-the-middle certificate to obtain a target server hello message, wherein the server certificate comprises a public key of the server, and the man-in-the-middle certificate comprises a public key of the protection device; and
instruct the network interface to send the target server hello message to the client device.

18. The protection device according to claim 10, wherein the protection device further comprises a hardware accelerator configured to generate the man-in-the-middle DH parameter, generate a session key, decrypt the original encrypted packet, or encrypt the inspected plaintext data, wherein:
when the hardware accelerator is configured to generate the session key, the instructions when executed by the processor, further cause the processor to:
input the man-in-the-middle DH parameter and the client DH parameter into the hardware accelerator,
receive the first session key generated by the hardware accelerator,
input the man-in-the-middle DH parameter and the server DH parameter into the hardware accelerator, and
receive the second session key generated by the hardware accelerator;
when the hardware accelerator is configured to decrypt the original encrypted packet, the instructions when executed by the processor, further cause the processor to:
input the first session key and the original encrypted packet into the hardware accelerator,
receive the plaintext data obtained through decryption by the hardware accelerator,
input the second session key and the original encrypted packet into the hardware accelerator, and
receive the plaintext data obtained through decryption by the hardware accelerator; or
when the hardware accelerator is configured to encrypt the inspected plaintext data, the instructions when executed by the processor, further cause the processor to:
input the second session key and the inspected plaintext data into the hardware accelerator,
receive the target encrypted packet obtained through encryption by the hardware accelerator,
input the first session key and the inspected plaintext data into the hardware accelerator, and
receive the target encrypted packet obtained through encryption by the hardware accelerator.

19. A non-transitory computer-readable storage medium with instructions stored therein, wherein, when the instructions are run on a computer, the computer is enabled to perform:
- separately send a man-in-the-middle DH parameter to a client device and a server, wherein the man-in-the-middle DH parameter is a DH parameter generated by a protection device configured to be deployed between the client device and the server;
- generate a first session key based on the man-in-the-middle DH parameter and a client DH parameter, wherein the client DH parameter is a DH parameter generated by the client device;
- generate a second session key based on the man-in-the-middle DH parameter and a server DH parameter, wherein the server DH parameter is a DH parameter generated by the server;
- receive an original encrypted packet; and
- when the original encrypted packet is from the client device, decrypt the original encrypted packet with the first session key, inspect plaintext data obtained through the decryption, encrypt the inspected plaintext data with the second session key to obtain a target encrypted packet, and send the target encrypted packet to the server; or
- when the original encrypted packet is from the server, decrypt the original encrypted packet with the second session key, inspect plaintext data obtained through decryption, encrypt the inspected plaintext data with the first session key to obtain a target encrypted packet, and send the target encrypted packet to the client device.

* * * * *